United States Patent [19]

Itami et al.

[11] Patent Number: 5,666,282
[45] Date of Patent: Sep. 9, 1997

[54] PROGRAMMABLE CONTROLLER AND METHODS OF SETTING AND DISPLAYING ITS INTERNAL INFORMATION

[75] Inventors: Shinzi Itami; Takeshi Ando, both of Aichi, Japan

[73] Assignees: Mitsubishi Denki Kabushiki Kaisha, Tokyo; Mitsubishi Electric Engineering Co., Ltd., Nagoya, both of Japan

[21] Appl. No.: 707,911

[22] Filed: Sep. 3, 1996

Related U.S. Application Data

[60] Continuation of Ser. No. 442,509, May 16, 1995, abandoned, which is a division of Ser. No. 200,010, Feb. 22, 1994, Pat. No. 5,471,380.

[30] Foreign Application Priority Data

Mar. 31, 1993 [JP] Japan .................. 5-074196

[51] Int. Cl.$^6$ ........................................ G06F 19/00
[52] U.S. Cl. ............................ 364/146; 364/140
[58] Field of Search ............................ 364/146, 147, 364/140, 141, 188, 189, 191, 192, 193, DIG. 2 MS File; 395/141, 142, 161, 839, 892, 893; 345/192, 194

[56] References Cited

U.S. PATENT DOCUMENTS

| | | | |
|---|---|---|---|
| 4,158,226 | 6/1979 | Struger et al. | 364/142 |
| 4,449,180 | 5/1984 | Ohshima et al. | 364/147 |
| 4,504,900 | 3/1985 | Yomogida et al. | 364/147 |
| 4,542,452 | 9/1985 | Fukai et al. | 364/141 |
| 4,564,898 | 1/1986 | Yano | 364/140 |
| 4,592,053 | 5/1986 | Matsuura | 364/184 |
| 4,658,348 | 4/1987 | Flanagan et al. | 364/146 |
| 4,661,899 | 4/1987 | Usuda | 364/474.22 X |
| 4,663,704 | 5/1987 | Jones et al. | 364/146 |
| 4,680,697 | 7/1987 | Kiya et al. | 364/474.22 X |
| 4,705,552 | 11/1987 | Lisaka et al. | 364/473 X |
| 4,740,884 | 4/1988 | Shiho et al. | 364/143 |
| 4,994,957 | 2/1991 | Komiya et al. | 364/147 |
| 5,122,948 | 6/1992 | Zapolin | 364/131 |
| 5,385,569 | 1/1995 | Harada et al. | 395/700 |

FOREIGN PATENT DOCUMENTS

| | | |
|---|---|---|
| 0127122 | 12/1984 | European Pat. Off. |
| 0169911 | 1/1985 | European Pat. Off. |
| 0157882 | 10/1985 | European Pat. Off. |
| 0189487 | 8/1986 | European Pat. Off. |
| 0534777 | 3/1993 | European Pat. Off. |
| 3121977 | 3/1982 | Germany |
| 62-100801 | 5/1987 | Japan |
| 2133180 | 7/1984 | United Kingdom |
| 2192471 | 1/1988 | United Kingdom |
| 2231690 | 11/1990 | United Kingdom |

OTHER PUBLICATIONS

Volkmar Kussl, *Programming of Process Computing Systems*, published by VDI–Verlag 1975, pp.110 to 113 and 118 to 121.

*Primary Examiner*—Joseph Ruggiero
*Attorney, Agent, or Firm*—Sughrue, Mion, Zinn, Macpeak & Seas

[57] ABSTRACT

A programmable controller has a programmable controller unit and a peripheral device which facilitates defining and managing set values of both the internal devices of the programmable controller and the upper and lower limit values by allowing the programmable controller unit and the peripheral device to store set values as reference values for judging the magnitudes of current values of information and updating these values under the control of a sequence program. Further, the programmable controller and peripheral device facilitate the consecutive display, real-time display, etc. of the contents of internal devices by displaying sequentially the contents of these internal devices at predetermined intervals under the control of a sequence program. Additionally this invention allows numerically represented character information stored in internal devices of a programmable controller to be displayed in the form of characters by a simple peripheral device. This display operates under the control of a sequence program and converts stored internal information into character information which indicates display shapes.

4 Claims, 27 Drawing Sheets

FLOWCHART OF OPERATION FOR SETTING CONTENTS OF UPPER/LOWER VALUE STORAGE MEMORY 202 (PERIPHERAL DEVICE)

FLOWCHART TO SET COUNTER WHOSE DEVICE NAME IS "C" AND DEVICE NUMBER IS "0" SO THAT LOWER LIMIT IS 100 AND UPPER LIMIT IS 200. ALL INPUT FROM PERIPHERAL DEVICE

SIMPLE PERIPHERAL DEVICE

CPU MODULE

FLOWCHART OF OPERATION FOR SETTING CONTENTS OF
UPPER/LOWER VALUE STORAGE MEMORY 802 (CPU MODULE)

FLOWCHART OF OPERATION FOR CHANGING INTERNAL DEVICE CONTENTS

FLOWCHART OF OPERATION FOR CHANGING INTERNAL
CONTENTS OF PROGRAMMABLE CONTROLLER OF FIG. 11

SIMPLE PERIPHERAL DEVICE

1701 DISPLAYS CONTENTS OF INTERNAL DEVICES CONSECTIVELY

EXPANDED VIEW OF PERIPHERAL DEVICE

FLOWCHART OF OPERATION FOR CONSECUTIVE DISPLAY OF INTERNAL DEVICE CONTENTS ON PERIPHERAL DEVICE

FLOWCHART FOR HIGH SPEED CONSECUTIVE DISPLAY OF DEVICE CONTENTS OF P/C OF FIF. 15

SIMPLE PERIPHERAL DEVICE

PROCEDURE FOR REGISTERING A FIRST DEVICE STORAGE NUMBER

OPERATION TO CHANGE INTERNAL DEVICE CONTENTS USING SIMPLE
PERIPHERAL DEVICE OF CONVENTIONAL PROGRAMMABLE CONTROLLER

CONVENTIONAL PERIPHERAL DEVICE

CPU MODULE

PROGRAMMABLE CONTROLLER AND METHODS OF SETTING AND DISPLAYING ITS INTERNAL INFORMATION

This is a continuation of application Ser. No. 08/442,509, abandoned, filed May 16, 1995 which is a divisional of application Ser. No. 08/200,010, now U.S. Pat. No. 5,471, 380.

BACKGROUND OF THE INVENTION

1. Field of the Invention

The present invention relates to a programmable controller which ensures ease of managing internal device contents, such as timer and counter set values, or ease of registering and managing the upper and lower limit values of the timer, counter and other set values. The invention also relates to a programmable controller which facilitates continuous display and character display. Further, the invention relates to a method for setting internal information, e.g., timer and counter set values, and to a method for setting the internal information of the upper and lower limit values of the timer, counter and other set values, and to a displaying method for a programmable controller.

2. Description of the Background Art

FIG. 30 is a perspective view which shows the arrangement of a conventional programmable controller (hereinafter referred to as the "PC"). In this drawing, the numeral 3101 indicates a CPU module, 3102 represents input/output modules which process predetermined signals between the CPU module 3101 and external devices (not shown), and 3103 denotes a power supply module which supplies power to the CPU module 3101, the input/output modules 3102 and other hardware. It is to be understood that the CPU module 3101, the input/output modules 3102 and the power supply module 3103 constitute a PC unit 3104.

3105 designates a simple peripheral device which is used by an operator and others at the field site to, for example, enter data for internal data setting and display monitoring information. 3105a indicates a cable for connection between the PC unit 3104 and the peripheral device 3105.

3106 represents a display section and 3107 denotes input means, for example, an input section. This input section 3107 has a keyboard and is provided for the simple peripheral device 3105 together with the display section 3106.

3108 designates a peripheral device which is used to, for example, write sequence programs, enter data for internal information setting, and display the monitoring information of the PC unit 3104.

Generally, the simple peripheral device 3105 is connected to the PC unit 3104. However, if, for example, a sequence program cannot be written using the simple peripheral device 3105, the peripheral device 3108 is connected to the PC unit 3104 instead. It is to be noted that the peripheral device 3108 is larger than the simple peripheral device 3105 and cannot be carried easily.

3109 indicates a display section and 3110 denotes an input section. The display section 3109 and the input section 3110 are disposed on the peripheral device 3108. 3108a designates a cable for connection between the PC unit 3104 and the peripheral device 3108.

FIG. 31 shows the block arrangement of the peripheral device 3105 in FIG. 30. In this drawing, 3201 indicates a CPU, 3202 represents RAM, and 3203 denotes ROM.

The CPU 3201 uses the RAM 3202 as a working area and is designed to execute a program stored in the ROM 3203.

The display section 3106 shows the monitoring information and the contents of the timers, counters, etc., to allow the operator at the field site to, for example, set the contents of internal devices via the input section 3107.

3206 indicates an interface for PC connection which matches the internal signals of the PC unit 3104 with signals transmitted over the cable 3105a.

FIG. 32 is a block arrangement diagram showing the arrangement of the CPU module 3101 in FIG. 30. In this drawing, 3301 represents a CPU, 3302 denotes RAM, 3303 designates ROM, 3304 indicates an input/output section provided for the conversion, etc., of signals internal to the CPU module 3101 into external input/output signals or vice versa, 3305 designates an interface for peripheral device connection which matches the internal signals of the CPU module 3101 with signals transmitted over the cable 3105a, 3306 denotes user program memory, and 3307 represents internal information storage means, for example, device memory.

The CPU 3301 uses the RAM 3302 as a working area and executes a sequence program stored in the user program memory 3306 under the control of a system program stored in the ROM 3303. It is to be understood that the PC is arranged to rewrite the contents of the device memory 3307 under the control of the sequence program and to operate in a predetermined manner with reference to the contents of the device memory 3307.

The internal information in the PC, such as timer and counter set values, are stored into the device memory 3307 provided in the CPU module 3101 as the contents of the internal devices. It is to be noted that said timer set values are the set values of the time-out time of the timers. Also, the counter set values are the set values of the count-up values of the counters.

FIG. 33 is a flowchart which illustrates an operation where internal device contents such as timer and counter set values are changed by the simple peripheral device 3105 shown in FIG. 30. In step S3401 of FIG. 33, the operator enters from the input section 3107 the device name and device number of an internal device whose contents will be changed, and the processing proceeds to step S3402. It is to be understood that the address of the device memory 3307, i.e., the address where the internal device contents are stored, are specified by the device name and device number.

In step S3402, the timer or counter set value, or the contents of the internal device whose address has been specified, is read from the device memory 3307 of the CPU module 3101 and shown on the display section 3106, and the execution advances to step S3403.

In step S3403, the operator enters a new value from the input section 3107 and terminates the change operation.

Generally, in the PC, the permissible setting limit values of the timer and counter set values, i.e., upper and lower limit values of the set values, are set in the sequence program to prevent any set value from being defined outside this range. To change these upper and lower limit values, it was required by prior art programmable controllers to connect the peripheral device 3108 to the CPU module 3101 instead of connecting the simple peripheral device 3105 and use this peripheral device 3108 to modify the sequence program. This work is difficult for a worker in the field who is not skilled in the creation of sequence programs.

Also, when the simple peripheral device 3105 is used, faulty values might be defined, since it is arranged to define the timer and counter set values, etc., independently of the upper and lower limit values registered.

An example where such faulty values are defined will be described with respect to a system which marks the centers of products (not shown) moving on a belt conveyor (not shown).

First, this system will be described in general. The belt conveyor, which is driven by a pulse motor, has a pulse generator (not shown) which outputs one pulse for each 1 mm which the belt conveyor moves. This system has a sensor which detects products and a counter (not shown) which counts the output pulses of the pulse generator. The system is designed such that the counter is reset on the leading edge of the detection output of the sensor and products are marked when the counter has counted up to a preset value.

In this example, there are various products which require marking at different intervals. For instance, some products are marked at the center when the counter is set to 100 while other products are marked at the center when the counter is set to 200. The counter is set according to the product to be marked.

If a worker at the plant field site makes a mistake using the simple peripheral device 3105 in this system, for example, if the counter is set to 1000 for products for which the counter should be set to 100, then a problem arises. In such a case, the products are not marked. If this is not noted visually, the products will be shipped without being marked.

In the conventional art, there is known a programmable controller disclosed in Japanese Laid-Open Patent Publication No. SHO62-100801. This programmable controller judges whether or not the current value of a timer or a counter is more than the upper limit value registered beforehand. If the current value is judged above the upper limit value, the programmable controller forces the current value to be not more than the upper limit value. It is to be noted that in the case of this programmable controller, the sequence program must be modified using a large-sized peripheral device similar to the peripheral device 3108 to change the upper and lower limit values of the timers and counters.

Conventionally, as described above, the set values of the internal devices such as the timers and counters can be defined and their upper and lower limit values registered or changed via the peripheral device 3108, but the peripheral device 3108 is large in size and cumbersome. Additionally, it is difficult for workers at the field site unskilled in sequence program writing to perform the above operation because it is performed in the sequence program.

Also, the conventional simple peripheral device 3105 has the disadvantage of not allowing the upper and lower limit values of the timers, counters and others to be registered and changed. Another drawback which the conventional simple peripheral device 3105 has is that it allows a faulty value which is entered accidentally as the set value of the timer, counter or the like, to be stored unchanged as the set value.

Also, since the contents of the internal devices are information given in any of binary, octal, decimal or hexadecimal formats, and the conventional peripheral device 3105 cannot display characters, a problem arises because numerically represented character information stored in the internal devices cannot be displayed as characters.

Another disadvantage of the prior art is the difficulty of displaying the contents of the internal devices consecutively or in real time.

Accordingly, it is an object of the present invention to overcome the above problems by providing a programmable controller which ensures ease of defining or managing the set values of internal devices of the PC, such as timers and counters, and facilitates the definition and management of the upper and lower limit values. Another object of the present invention is to provide a method for setting the internal information of a programmable controller which ensures ease of defining or managing the set values of the timers, counters, etc. A further object of the present invention is to provide a method for setting the internal information of a programmable controller which facilitates the definition or management of the upper and lower limit values.

It is another object of the present invention to provide a programmable controller which allows numerically represented character information stored in internal devices to be displayed in the form of characters by a simple peripheral device.

It is a further object of the present invention to provide a programmable controller and a displaying method for the programmable controller which facilitate the consecutive display, real-time display, etc., of the contents of internal devices.

SUMMARY OF THE INVENTION

A programmable controller according to the present invention is equipped with a programmable controller unit and a peripheral device which store as internal information set values defined as reference values for judging the magnitudes of current values of predetermined information under the control of a sequence program. The programmable controller comprises input means disposed in the peripheral device, upper/lower limit value storage means disposed in the peripheral device to store the upper and lower limit values of the set values, register means disposed in the peripheral device to register the upper and lower limit values entered from the input means into the upper/lower limit value storage means, judging means provided in the peripheral device to judge whether or not an input value entered from the input means lies within the range of the upper and lower limit values stored in the upper/lower limit value storage means, and internal information updating means which updates the set value with the input value according to the upper/lower limit value range judgment of the judging means.

Also, the programmable controller is equipped with a programmable controller unit and a peripheral device which store as internal information set values defined as reference values for judging the magnitudes of current values of predetermined information under the control of a sequence program, and comprises upper/lower limit value storage means disposed in the programmable controller unit to store the upper and lower limit values of the set values, input means disposed in the peripheral device, register means which registers the upper and lower limit values entered from the input means into the upper/lower limit value storage means, judging means provided in said programmable controller unit to judge whether or not an input value entered from the input means lies within the range of the upper and lower limit values stored in the upper/lower limit value storage means, and internal information updating means which updates the set value with the input value according to the upper/lower limit value range judgment of the judging means.

Also, the judging means is disposed in the peripheral device and is designed to judge whether or not the input value entered from the input means falls within the upper/lower limit value range read from the upper/lower limit value storage means sent by the programmable controller unit.

Also, the programmable controller includes keyword judging means which judges whether or not a keyword entered from the input means matches a predetermined keyword or any of a predetermined number of predetermined keywords. The register means is designed to register the upper and lower limit values entered from the input means into the upper/lower limit value storage means according to the match judgment of the keyword judging means.

Also, the invention includes a method of setting the internal information of a programmable controller according to the present invention, including a programmable controller unit and a peripheral device which store set values defined as reference values for judging the magnitudes of current values of predetermined information under the control of a sequence program. The method comprises the step of entering the upper and lower limit values of the set values from the peripheral device and registering said entered upper and lower limit values into the peripheral device, the step of entering an input value from the input means of the peripheral device, and the step of judging whether or not said input value lies within the range of the upper and lower limit values stored in the upper/lower limit value storage means and updating the set value with said input value according to an upper/lower limit value range judgment.

Also, the invention includes a method of setting the internal information of a programmable controller, including a programmable controller unit and a peripheral device which store set values defined as reference values for judging the magnitudes of current values of predetermined information under the control of a sequence program. The method comprises the step of entering the upper and lower limit values of the set values from the peripheral device and registering said entered upper and lower limit values into said programmable controller unit, the step of entering an input value from the input means of the peripheral device, and the step of causing the programmable controller unit to judge whether or not the input value lies within the range of the upper and lower limit values stored in the upper/lower limit value storage means and to update the set value with said input value according to an upper/lower limit value range judgment.

The invention also includes a method of setting the internal information of a programmable controller, including a programmable controller unit and a peripheral device which store set values defined as reference values for judging the magnitudes of current values of predetermined information under the control of a sequence program. The method comprises the step of entering the upper and lower limit values of the set values from the peripheral device and registering said entered upper and lower limit values into the programmable controller unit, the step of entering an input value from the input means of the peripheral device, and the step of causing the peripheral device to judge whether or not said input value lies within the range of the upper and lower limit values stored in the upper/lower limit value storage means and updating the set value with said input value according to an upper/lower limit value range judgment.

Also, the method of setting the programmable controller internal information performs the step of judging whether or not a keyword entered from the input means matches a predetermined keyword or any of a predetermined number of predetermined keywords, and the upper and lower limit values entered from the input means are registered into the upper/lower limit value storage means according to a match judgment in said step.

Also, a programmable controller which includes internal information storage means which stores predetermined internal information, is equipped with a programmable controller unit and a peripheral device operating under the control of a sequence program, and includes timing means, input means, and display means which reads and displays sequentially the storage contents of the internal information storage means by changing read addresses at predetermined intervals based on the timing output of the timing means according to a predetermined directive entered from the input means.

The programmable controller includes a plurality of timing means, and the display means reads and displays sequentially the storage contents of the internal information storage means by changing the addresses at predetermined intervals based on a timing means pre-selected out of the plurality of timing means according to a predetermined directive entered from the input means.

The invention also includes a displaying method for a programmable controller. The programmable controller includes internal information storage means which stores predetermined internal information and is equipped with a programmable controller unit and a peripheral device which operate under the control of a sequence program. The display method comprises the step of displaying the internal information stored at the predetermined address of the internal information storage means, and the step of reading and displaying sequentially the storage contents of the internal information storage means by changing the addresses at predetermined intervals according to a predetermined directive.

The programmable controller includes internal information storage means which stores predetermined internal information and is equipped with a programmable controller unit and a peripheral device which operate under the control of a sequence program. The display method comprises the step of displaying the internal information stored at the predetermined address of said internal information storage means, the step of directing and entering display intervals, and the step of reading and displaying sequentially the storage contents of said internal information storage means by changing the addresses at said predetermined intervals.

Also, a programmable controller which includes internal information storage means which stores predetermined internal information, is equipped with a programmable controller unit and a peripheral device which operate under the control of a sequence program, and has device number storage means stored with device numbers indicating the addresses of the internal information storage means, and display means which reads the internal information from the internal information storage means according to the device number read from the device number storage means, converts said read internal information into character information indicating character display shapes, and displays the character information.

Another display method comprises the step of registering a device number indicating the address of the internal information storage means and the step of reading the internal information stored in the internal information storage means by advancing the address, starting at the address indicated by the device number registered, converting sequentially said read internal information into character information indicating character display shapes, and displaying the character information.

Alternatively, the display method consists of the step of registering a predetermined number of device numbers indicating the addresses of said internal information storage means, and the step of reading in sequence said predetermined number of device numbers registered into said device number storage means, reading the internal information stored in the internal information storage means indicated by said device numbers, converting sequentially said internal information into character information indicating character display shapes, and displaying the character information.

Also, the display method for the programmable controller includes the step of judging whether or not data is to be displayed. This is accomplished by reading the contents of a character information display enable/disable device corresponding to the data. If the contents of the enable/disable device indicate that the data should be displayed, the display step is rendered executable.

DESCRIPTION OF THE PREFERRED EMBODIMENTS

As described above, in the PC according to the present invention, the upper and lower limit values of the set values of the PC internal devices, such as the timers and counters, are registered to the upper/lower limit value storage means of the peripheral device.

Also, the upper and lower limit values of the set values of the PC internal devices, such as the timers and counters, are registered to the upper/lower limit value storage means of the PC.

Also, the upper and lower limit values of the set values of the PC internal devices, such as the timers and counters, are registered to the upper/lower limit value storage means of the PC, and whether or not the entered set values of the PC internal devices, such as the timers and counters, lie within the upper/lower limit value range is judged by the judging means provided in the peripheral device.

Also, the contents of the internal devices are displayed consecutively by entering a predetermined command from the keyboard.

Also, the contents of the internal devices are displayed consecutively at high speed by entering a predetermined command from the keyboard. The contents are displayed first at long intervals and subsequently at short intervals.

Also, the contents of the internal device specified by the first device number of the internal information storage means and the contents of the predetermined number of subsequent internal devices are displayed sequentially by the peripheral device in the form of characters.

Also, the predetermined number of device numbers stored beforehand in the device number storage means are read sequentially, and the contents of the internal information storage means specified by said read data can be displayed sequentially by the peripheral device in the form of characters.

Also, whether or not the predetermined contents of the internal information storage means are to be displayed is judged according to the contents of the specific internal device of said internal information storage means.

Figure 1:
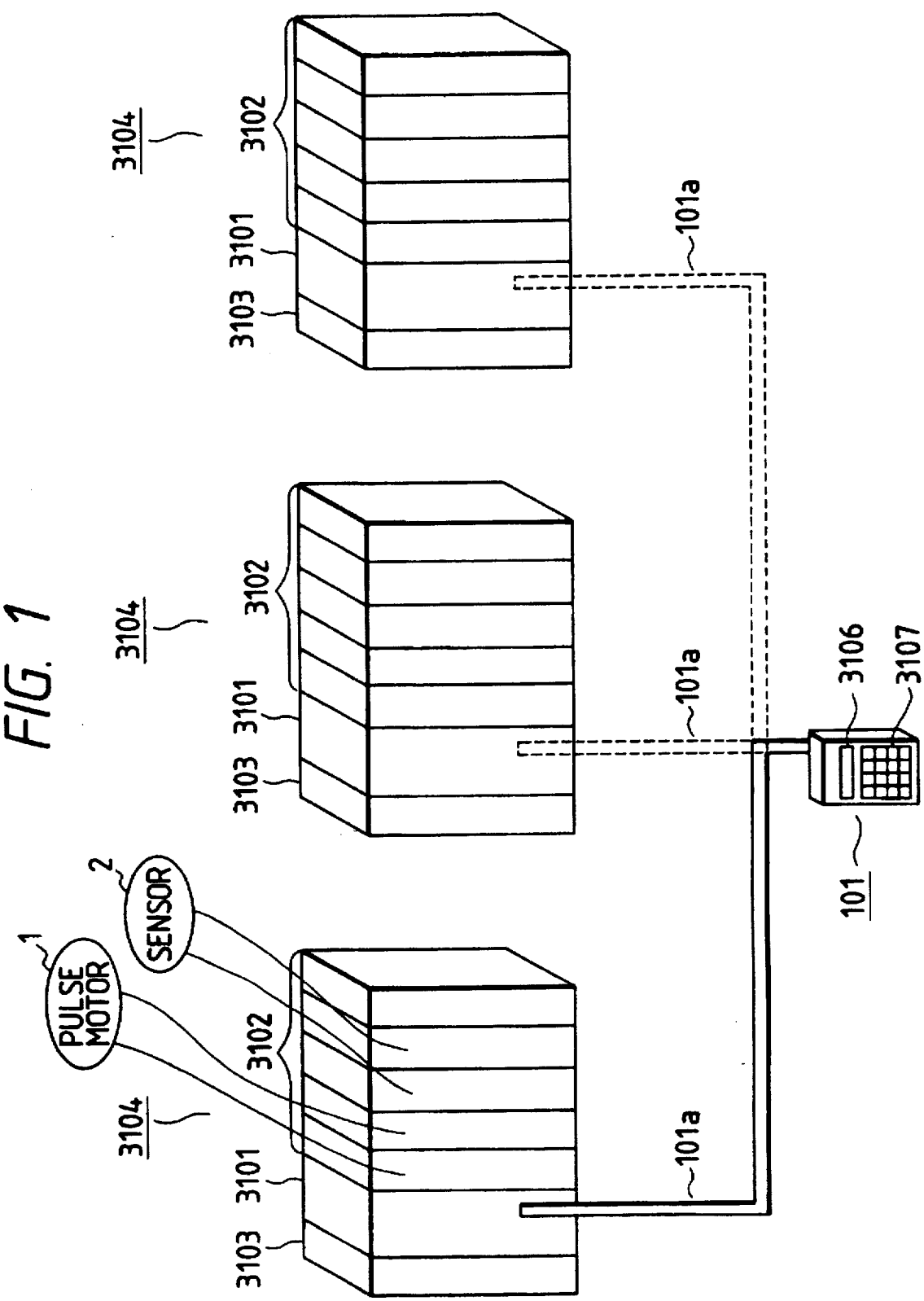
FIG. 1 is a perspective view illustrating the arrangement of a PC according to a preferred embodiment of the present invention.
Figure 30:
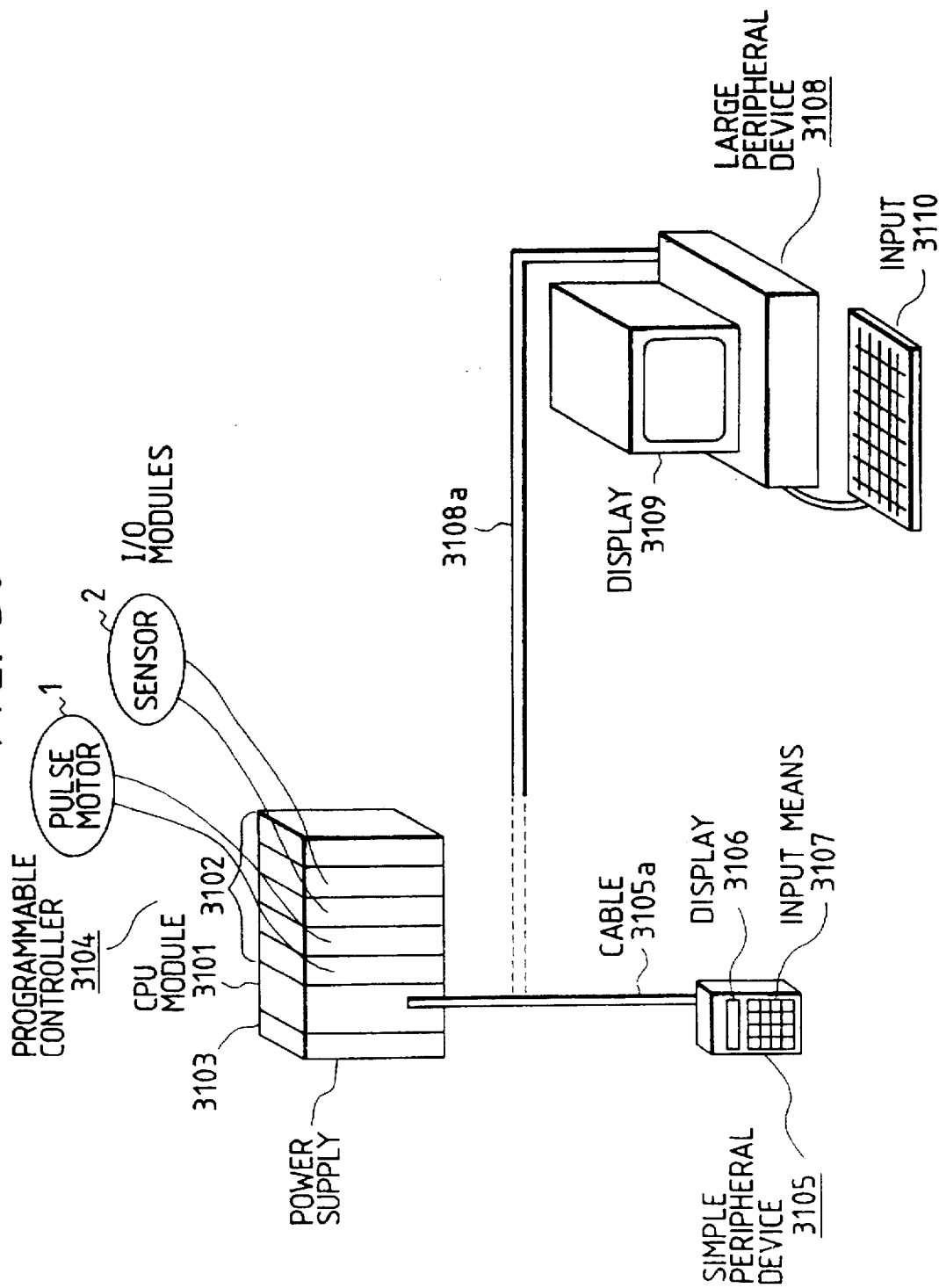
FIG. 30 is a perspective view illustrating the arrangement of a conventional PC.

FIG. 1 is a perspective view which shows the arrangement of a PC according to an embodiment of the present invention. In this drawing, the numerals 3101 to 3104, 3106 and 3107 indicate parts identical to those in FIG. 30 which shows the conventional example. 101 designates a simple peripheral device used by the operator at the field site to, for example, enter data for the setting, etc., of internal device contents and display monitoring information. It is to be noted that the display section 3106 and the input section 3107 are provided on the simple peripheral device 101. 101a denotes cables for connection between the PC units 3104 and the peripheral device 101.

Figure 2:
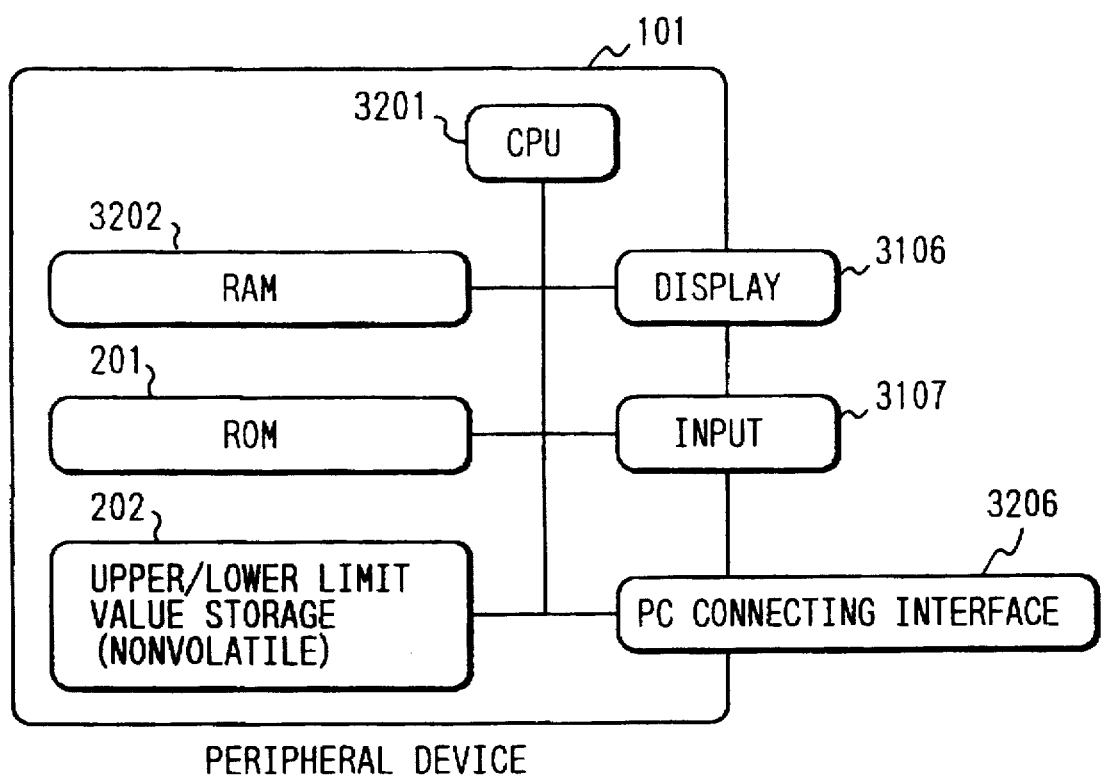
FIG. 2 is a block diagram illustrating the arrangement of a peripheral device in FIG. 1.
Figure 31:
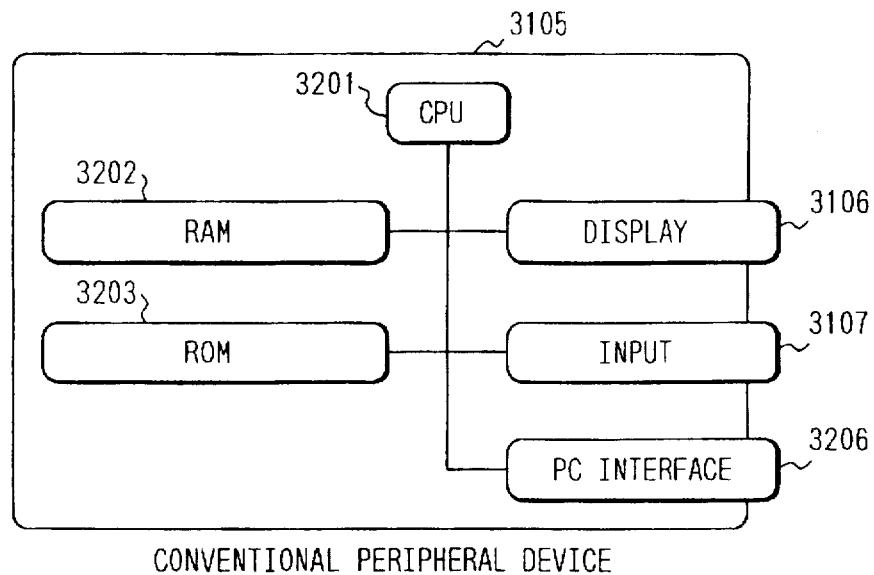
FIG. 31 is a block diagram illustrating the arrangement of a conventional peripheral device.

FIG. 2 shows the block arrangement of the peripheral device 101 in FIG. 1. In this drawing, 3201, 3202 and 3206 represent parts identical to those in FIG. 31 which illustrates the conventional example.

201 indicates ROM. It is to be understood that this ROM 201 is identical to the ROM 3203 in FIG. 31 with the exception that the contents stored in ROM 201 and ROM 3203 are different from each other.

202 designates upper/lower limit value storage means which stores the upper and lower limit values of the internal devices, for example, an upper/lower limit value storage memory. It is to be understood that this upper/lower limit value storage memory 202 is nonvolatile memory, such as EPROM, or RAM whose contents are backed up at power-off.

The CPU module 3101 is identical to the one used in the conventional example.

The CPU 3201, the RAM 3202 and the ROM 201 constitute register means. The CPU 3201, the RAM 3202 and the ROM 201 constitute judging means. The CPU 3201, the RAM 3202, the ROM 201, the PC connecting interface 3206, the cable 101a, the CPU 3301, the RAM 3302, the ROM 3303 and the peripheral device interface 3305 constitute internal information updating means.

A procedure for setting the contents of the upper/lower limit value storage memory 202, that is, a registration procedure, will now be described in accordance with the flowchart in FIG. 3.

First, in step S301, the operator enters a keyword from the input section 3107. If the keyboard entered is correct, the execution proceeds to step S302.

In step S302, the operator enters the device name and device number of an internal device from the input section 3107, and the processing advances to step S303.

In step S303, the operator enters the lower limit value of the set value of the corresponding device from the input section 3107 and the processing progresses to step S304.

In step S304, the operator enters the upper limit value of the set value of the corresponding device from the input section 3107 and execution moves to step S305.

In step S305, the lower and upper limit values entered in steps S303 and S304 are written to the upper/lower limit value storage memory 202 and the registration is terminated.

Figure 3:
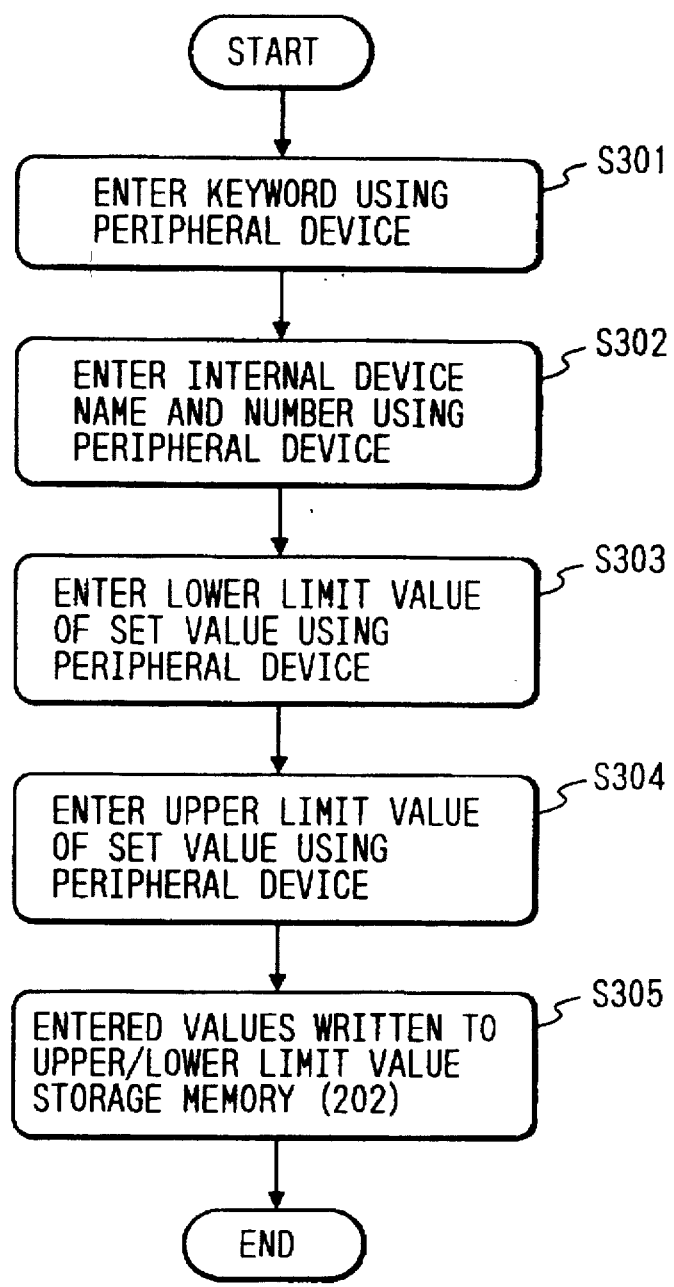
FIG. 3 is a flowchart illustrating a procedure of registering upper and lower limit values according to a preferred embodiment of the present invention.

It is to be understood that the operation shown in FIG. 3 is performed under the control of a program stored in the ROM 201 of the peripheral device 101.

A specific example of registering the upper and lower limit values of an internal device will now be described according to the flowchart in FIG. 4 by using the system which was described above in the conventional example, i.e., the system which marks the centers of products moving on the belt conveyor.

In this system, one pulse is output from the pulse generator provided in the pulse motor every time the belt conveyor driven by the pulse motor moves 1 mm. This system is also provided with a sensor which detects products and a counter which counts the output pulses of the pulse generator. The counter is reset on the leading edge of the detection output of the sensor and products are marked when this counter has counted up to a preset value.

In this specific example, the products range from those that are marked at the center when the counter is set to 100 to those that are marked at the center when the counter is set to 200. It is to be understood that the counter is set according to the products.

In this example, it is assumed that the lower limit value of the counter set value is 100, the upper limit value thereof is 200, and any value outside this range cannot be set.

Figure 4:
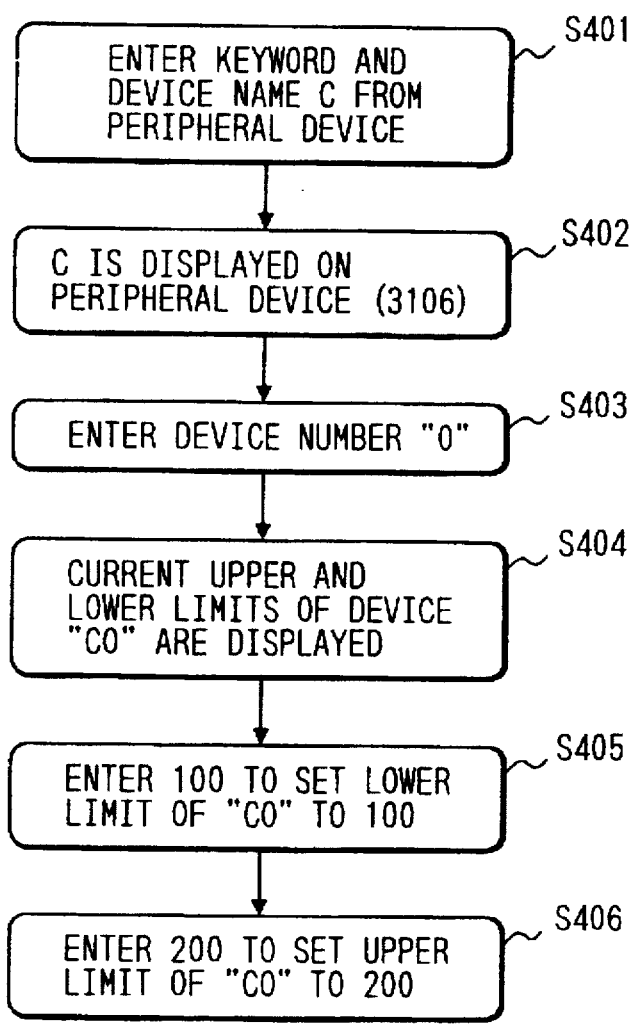
FIG. 4 is a flowchart illustrating a specific registered example of the upper and lower limit values according to a preferred embodiment of the present invention.

FIG. 4 is a flowchart wherein a counter whose device name is C and device number is 0 (i.e., whose address is specified C0) is set to the lower limit value of 00100 and the upper limit value of 00200. Also, the currently set lower and upper limit values are 00001 and 32767 respectively. These values are the initial set values of the PC and any value outside this range cannot be set.

In step S401, the operator enters the keyword and subsequently enters device name C to select the counter, and the execution progresses to step S402.

In step S402, C is displayed on the display section 3106 and the execution proceeds to step S403.

In step S403, the operator enters device number 0 and the processing moves forward to step S404.

In step S404, the range 00001-32767 defined by the current upper and lower limit values of the corresponding internal device is displayed and the processing advances to step S405.

In step S405, the operator enters 00100 from the input section 3107 so that the lower limit value of 00001 is overwritten by 00100, and the execution goes forward to step S406.

In step S406, the operator enters 00200 from the input section 3107 so that 36767 is overwritten by 00200. The lower and upper limit values entered in steps S405 and S406 are registered into the upper/lower limit value memory 202 and the operation is terminated.

An operation wherein internal device contents, such as a timer or counter set value, are changed by the operator will now be described in accordance with the flowchart in FIG. 5.

In step S501, the operator enters the device name and device number of the internal device and the operation advances to step S502.

In step S502, the contents of the corresponding internal device, i.e., the set value, etc., of the timer or counter, stored in the device memory 3307 of the CPU module 3101 are read and displayed on the display section 3106 via the PC connecting interface 3206, and the processing progresses to step S503.

In step S503, the operator enters an input value to the corresponding internal device as a new set value from the input section 3107 and the execution proceeds to step S505.

In step S504, it is judged whether or not the input data in step S503 lies within the upper/lower limit value range registered beforehand in the upper/lower limit value memory 202. If it is within the range, the operation goes forward to step S506. If the value is outside the range, the execution advances to step S507.

In step S506, the input value entered in step S503 is written to the corresponding internal device of the device memory 3307 and the operation is terminated.

If the execution has proceeded to step S507, an error message is displayed on the display section 3106 and the operation returns to step S503 to enable re-entry.

Figure 5:
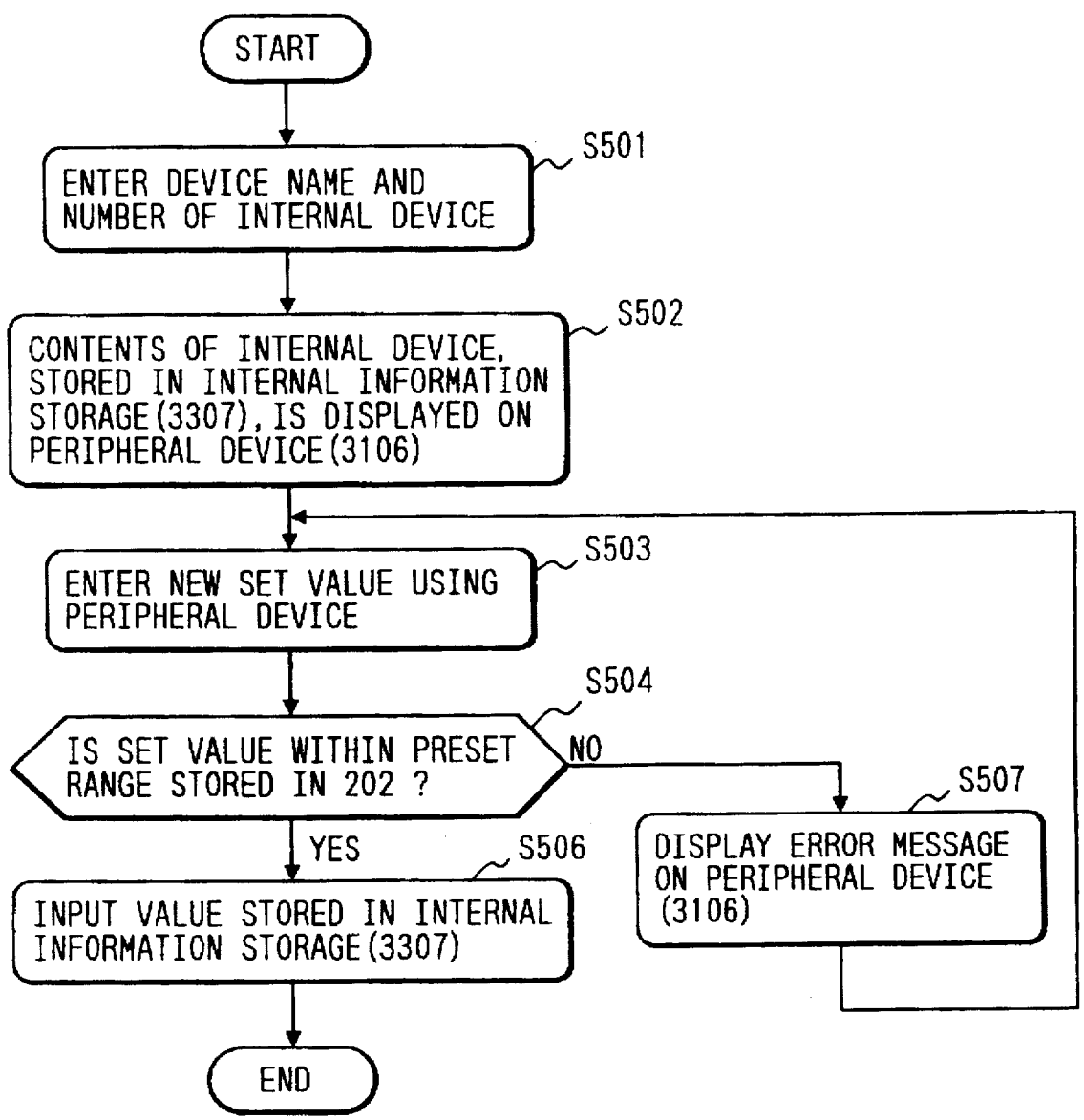
FIG. 5 is a flowchart illustrating an operation of changing the set value of a timer, a counter or the like according to a preferred embodiment of the present invention.

It is to be understood that the operation shown in FIG. 5 is conducted under the control of the program stored in the ROM 201 of the peripheral device 101.

Figure 6:
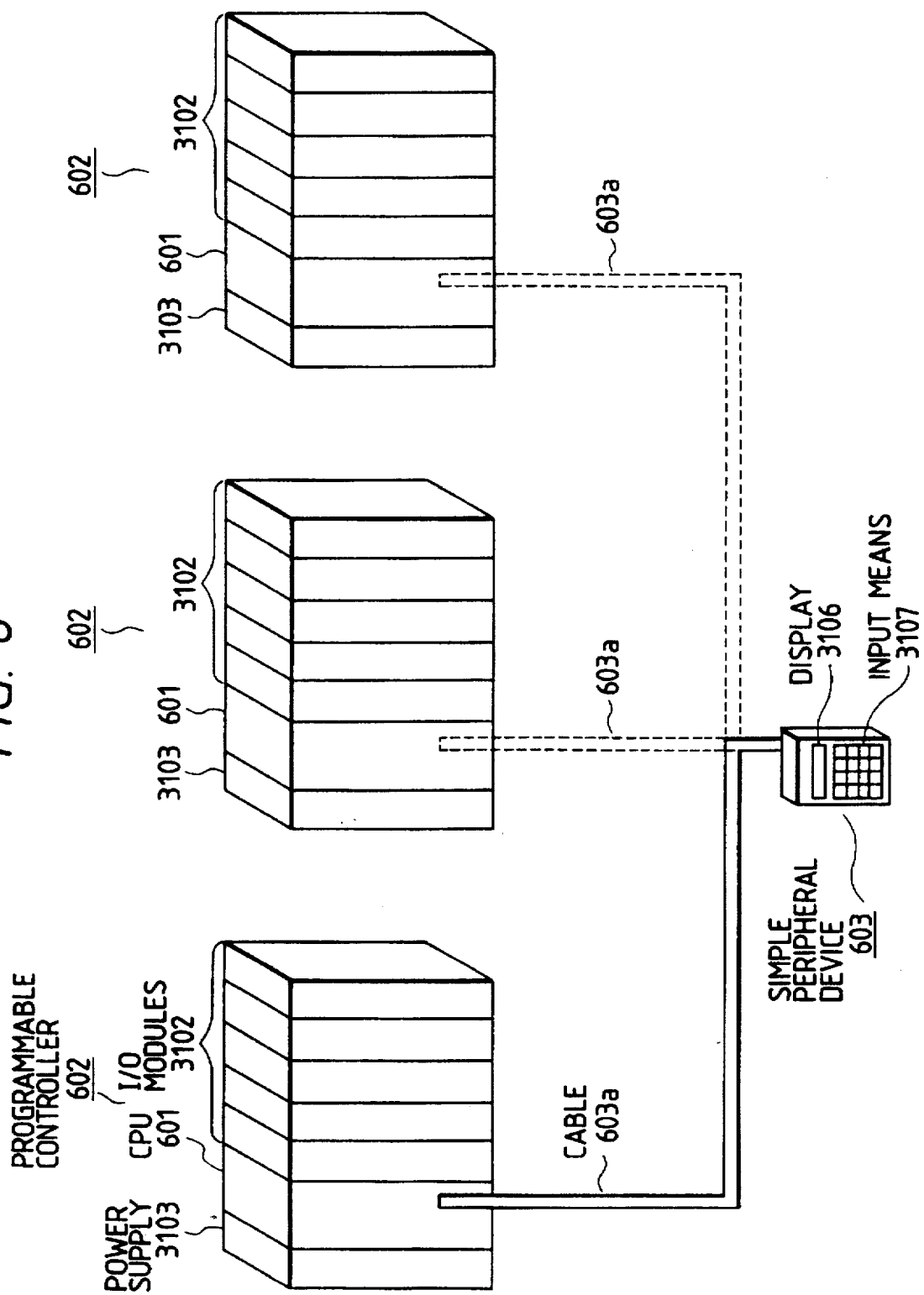
FIG. 6 is a perspective view illustrating the arrangement of a PC according to an alternative preferred embodiment of the present invention.

FIG. 6 is a perspective view which shows the arrangement of a PC according to an alternative embodiment of the present invention. In this drawing, 3102 and 3103 indicate parts identical to those in FIG. 30 which shows the conventional example.

601 denotes CPU modules, 602 designates PC units, 603 represents a simple peripheral device, and 603a indicates cables for connection of the CPU modules 601 and the simple peripheral device 603.

It is to be understood that the PC unit 602 is made up of the CPU module 601, the input/output modules 3102 and the power supply module 3103.

Figure 7:
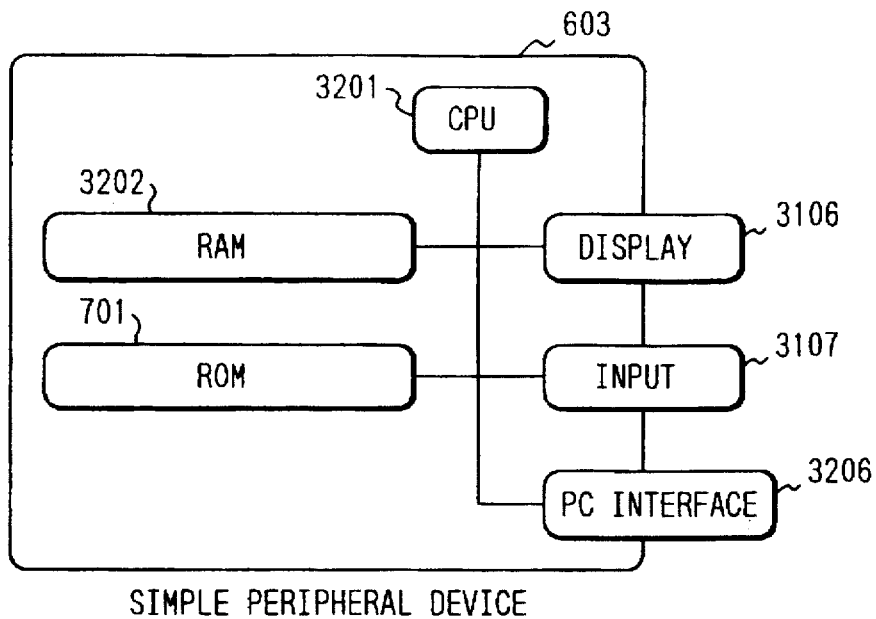
FIG. 7 is a block arrangement diagram of a peripheral device in FIG. 6.
Figure 32:
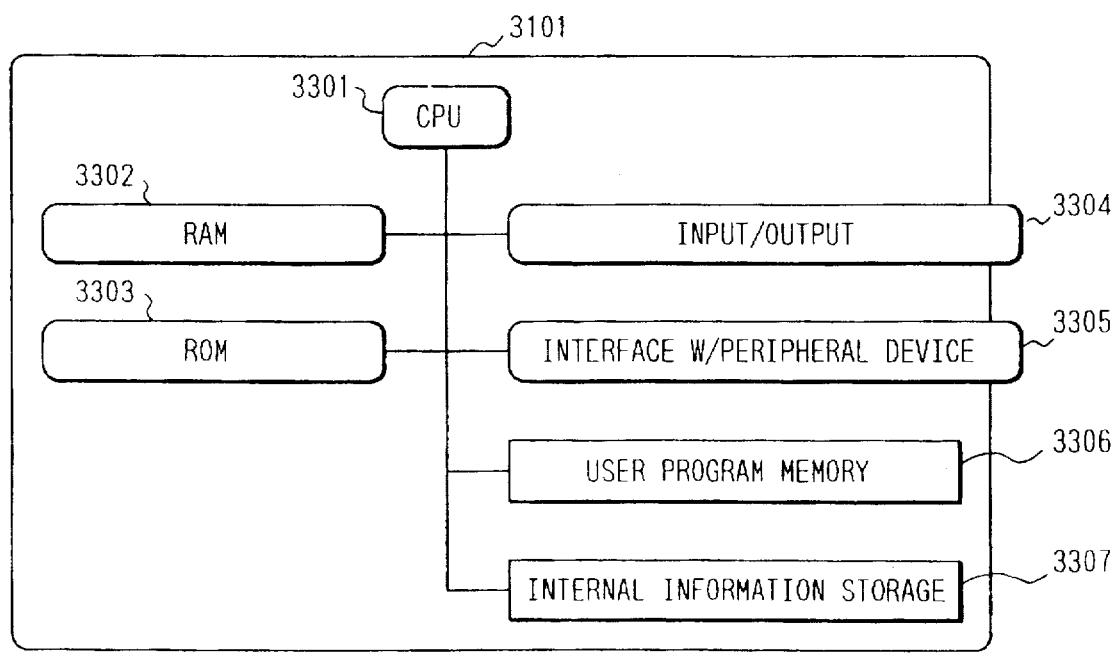
FIG. 32 is a block diagram illustrating the arrangement of a CPU module in FIG. 30.

FIG. 7 is a block arrangement diagram of the peripheral device 603 in FIG. 6. In this drawing, 3106, 3107, 3201, 3202 and 3206 are identical to the parts in FIG. 32 which illustrates the conventional example. 701 indicates ROM. It is to be noted that this ROM 701 is identical to the ROM 3203 shown in FIG. 31 with the exception that the contents stored therein are different from each other.

Figure 8:
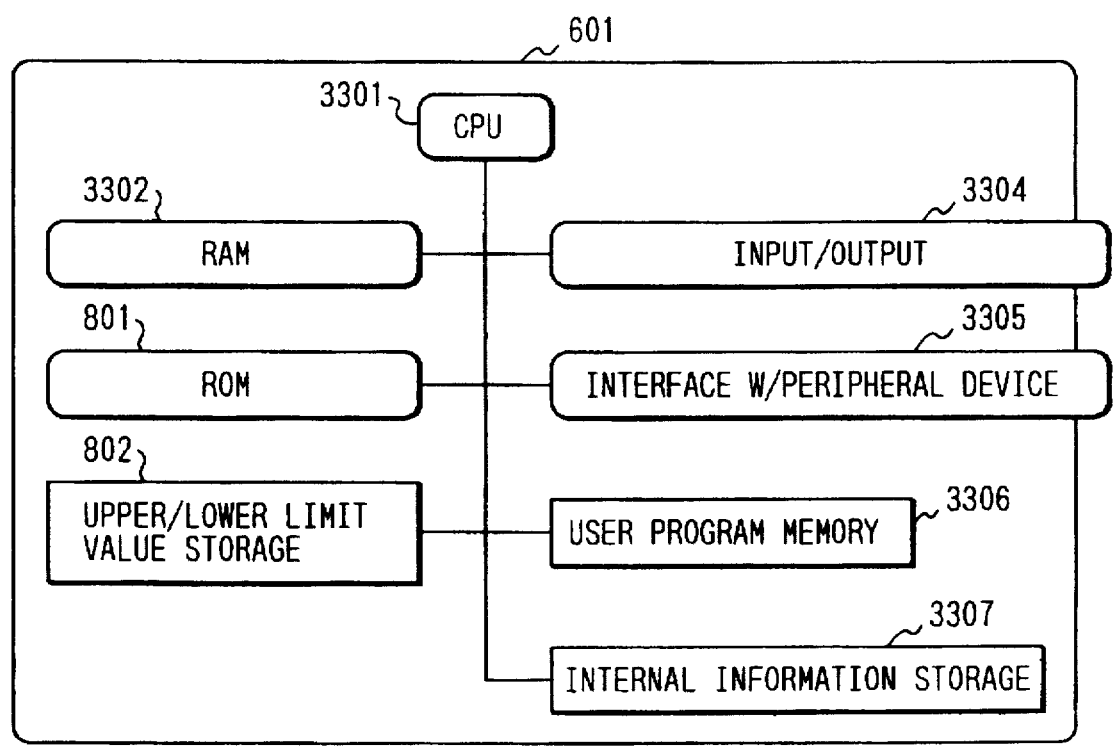
FIG. 8 is a block arrangement diagram of a CPU module in FIG. 6.

FIG. 8 is a block arrangement diagram of the CPU module 601 in the PC unit 602 in FIG. 6. In this drawing, 3301, 3302 and 3304 to 3307 are identical to the parts in FIG. 32 which illustrates the conventional example. ROM 801 is identical to the ROM 3303 shown in the conventional example with the exception that the contents stored therein are different from each other. 802 represents upper/lower limit value storage means provided in said CPU module 601, e.g., upper/lower limit value memory.

The CPU 3201, the RAM 3202, the ROM 701, the PC connecting interface 3206, the cable 603a, the peripheral device interface 3305, the CPU 3301, the RAM 3302 and the ROM 801 constitute register means. The CPU 3301, the RAM 3302 and the ROM 801 constitute judging means. The CPU 3301, the RAM 3302 and the ROM 801 constitute internal information updating means.

Figure 9:
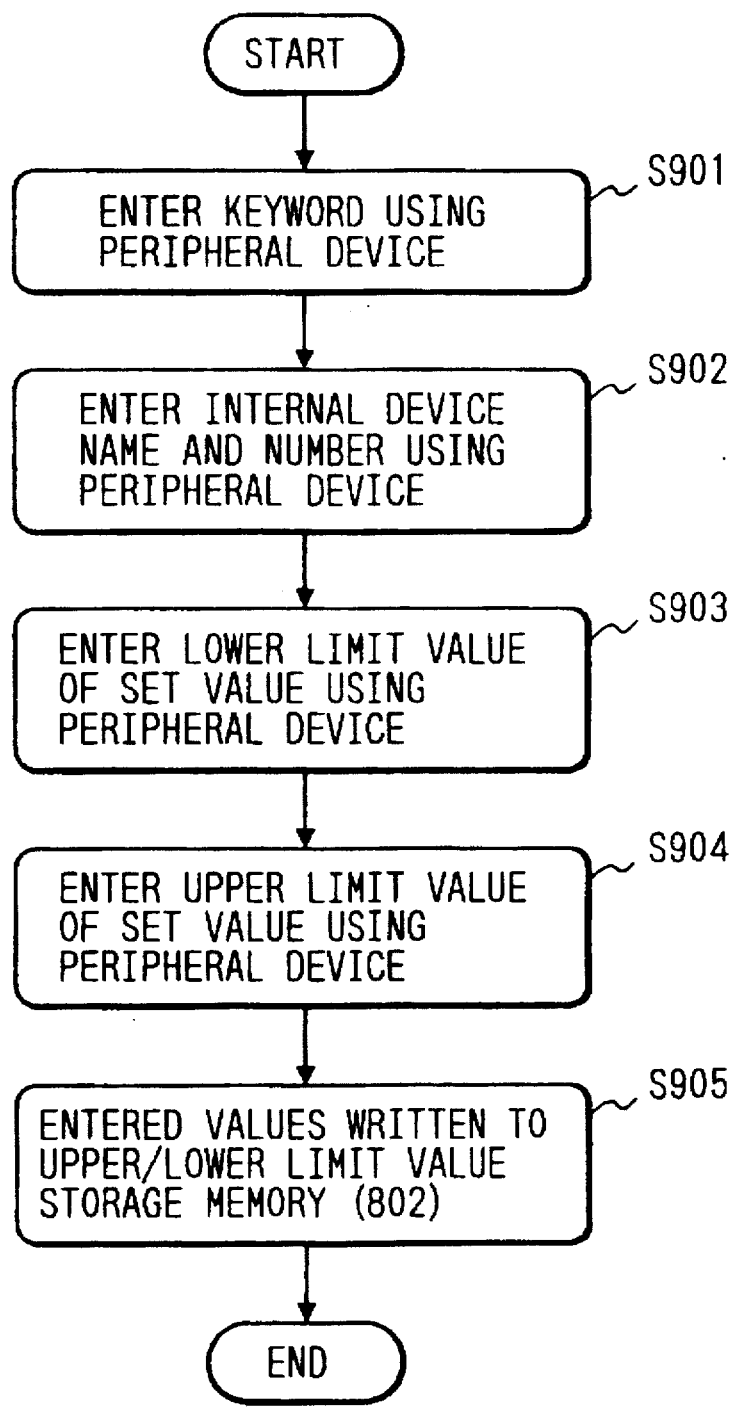
FIG. 9 is a flowchart illustrating an operation of registering upper and lower limit values in the PC shown in FIG. 6.

FIG. 9 is a flowchart which illustrates an upper/lower limit value registration operation consisting of the steps of entering a keyword and upper and lower limit values from the peripheral device 603 shown in FIG. 6 and of registering the entered upper and lower limit values into the upper/lower limit value memory 802. It is to be understood that FIG. 9 is identical to FIG. 3 with the exception that step S305 is replaced by step S905. In step S905, the upper and lower limit values are registered into the upper/lower limit value memory 802. Accordingly, this Embodiment is identical in operation to Embodiment 1 with the exception that the upper and lower limit values are registered into the upper/lower limit value memory 802 provided in the CPU module 601 of the PC.

It is to be noted that the operation shown in FIG. 9 is performed under the control of the program stored in the ROM 201 of the peripheral device 101 and a system program stored in the ROM 801 of the CPU module 601.

An operation wherein internal device contents, such as a timer or counter set value, are changed by the operator will now be described in accordance with the flowchart in FIG. 10.

Figure 10:
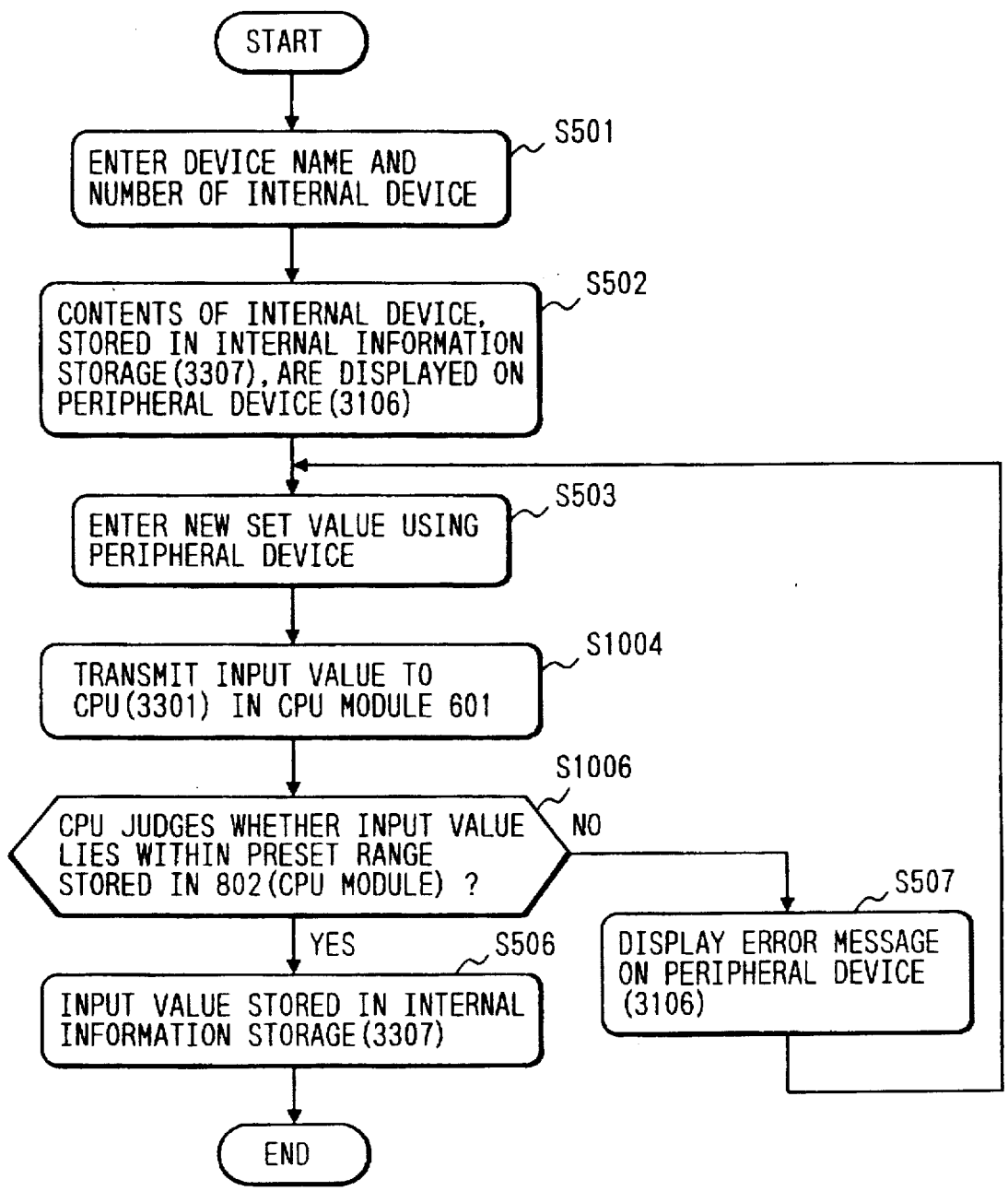
FIG. 10 is a flowchart illustrating an operation of changing the set value of a timer, a counter or the like in the PC shown in FIG. 6.

FIG. 10 shows a sequence identical to the one in FIG. 5 which illustrates Embodiment 1 with the exception that step S1004 exists between steps S503 and S505 and step S505 is replaced by step S1006.

In step S1004, the input value entered in step S503 is transmitted to the CPU 3301 of the CPU module 601 via the PC connecting interface 3206, and the operation advances to step S1006 when the CPU 3301 receives the value.

In step 1006, the CPU module 601 judges whether or not the input value in step S503 lies within the upper/lower limit value range registered beforehand in the upper/lower limit value memory 802. If it is within the range, the operation proceeds to step S506. If the value is outside the range, the execution progresses to step S507.

Figure 11:
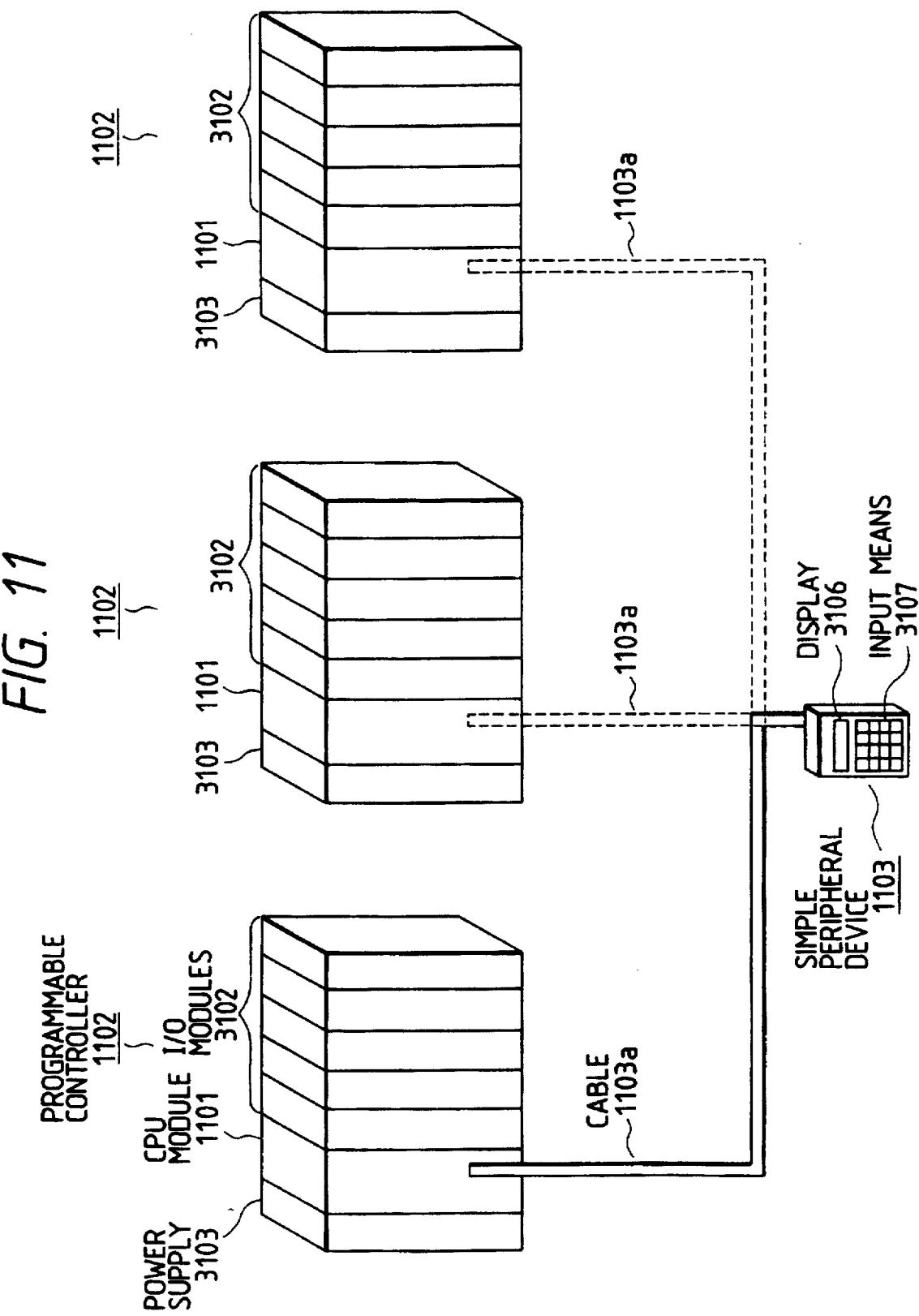
FIG. 11 is a perspective view illustrating the arrangement of a PC according to a further alternative preferred embodiment of the present invention.

FIG. 11 is a perspective view which shows the arrangement of a PC according to a further alternative embodiment of the present invention. In this drawing, 3102 and 3103 indicate parts identical to those in FIG. 30 which shows the conventional example.

1101 denotes CPU modules, 1102 designates PC units, 1103 represents a simple peripheral device, and 1103a indicates cables for connection of the CPU modules 1101 and the simple peripheral device 1103.

It is to be understood that the PC unit 1102 is constituted by the CPU module 1101, the input/output modules 3102 and the power supply module 3103.

Figure 12:
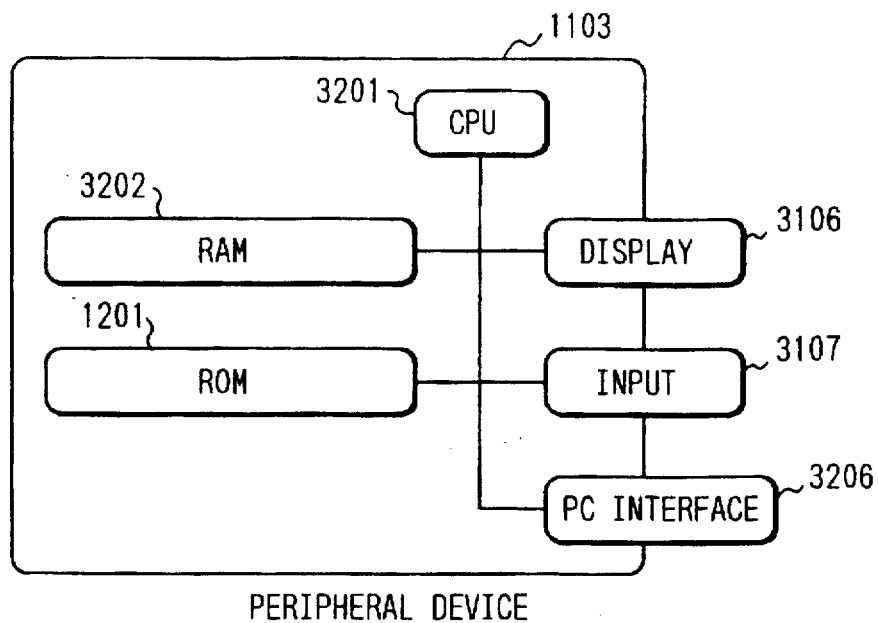
FIG. 12 is a block arrangement diagram of a peripheral device in FIG. 11.

FIG. 12 is a block arrangement diagram of the peripheral device 1103 in FIG. 11. In this drawing, 3106, 3107, 3201, 3202 and 3206 are identical to the parts in FIG. 32 which illustrates the conventional example. 1201 denotes ROM. It is to be noted that this ROM 1201 is identical to the ROM 3203 shown in FIG. 31 with the exception that the contents stored therein are different from each other.

Figure 13:
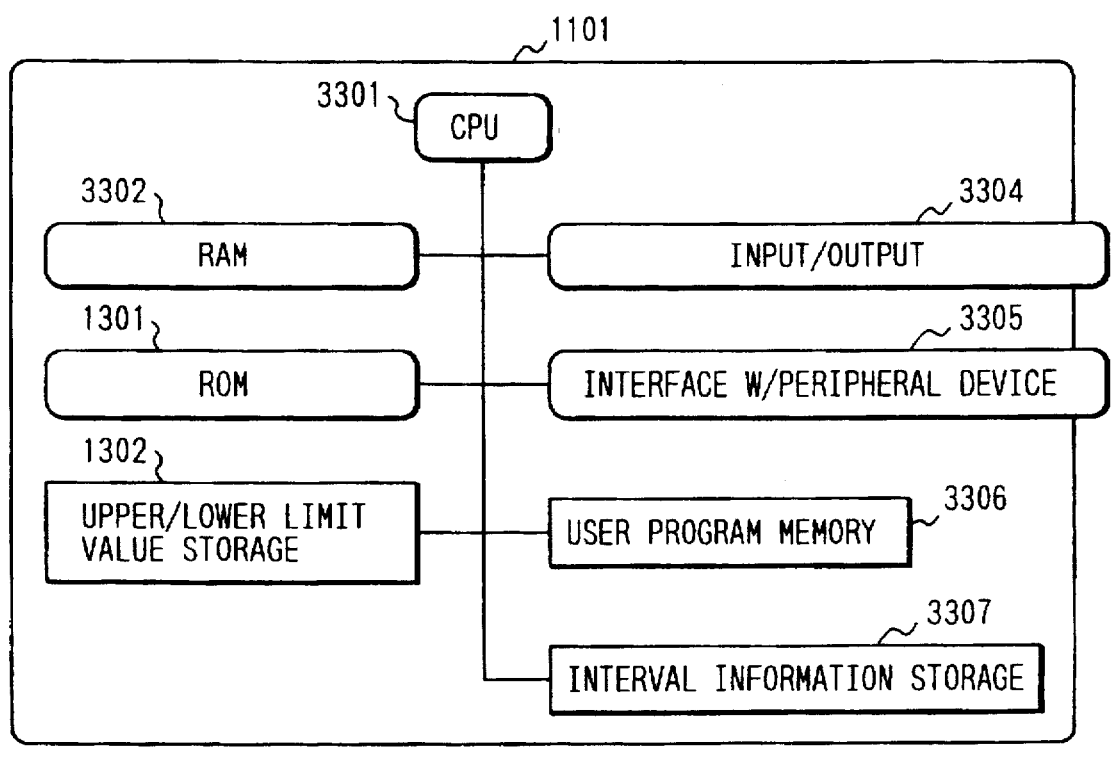
FIG. 13 is a block arrangement diagram of a CPU module in FIG. 11.

FIG. 13 is a block arrangement diagram of the CPU module 1101 in the PC unit 1102 in FIG. 11. In this drawing, 3301, 3302 and 3304 to 3307 are identical to the parts in FIG. 32 which illustrates the conventional example.

In the drawing, ROM 1301 is identical to the ROM 3303 shown in the conventional example with the exception that the contents stored therein are different from each other. 1302 represents upper/lower limit value memory.

An upper/lower limit value registration operation consisting of the steps of entering a keyword and upper and lower limit values from the peripheral device 1103 shown in FIG. 11 and of registering the entered upper and lower limit values into the upper/lower limit value memory 1302 is identical to the operation shown in FIG. 9 illustrating Embodiment 2.

An operation wherein internal device contents, such as a timer or counter set value, are changed by the operator will now be described in accordance with the flowchart in FIG. 14.

Figure 14:
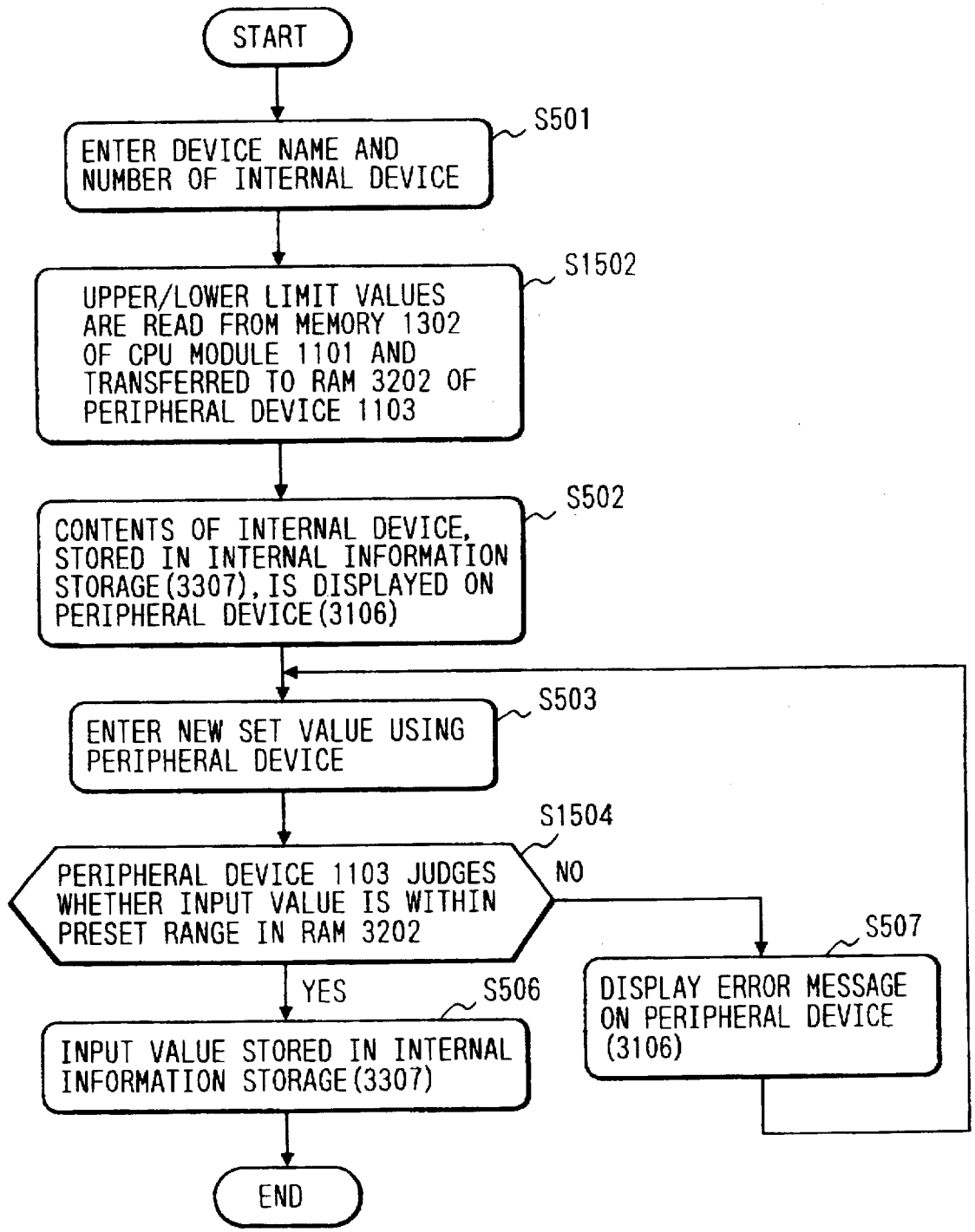
FIG. 14 is a flowchart illustrating an operation of changing the set value of a timer, a counter or the like in the PC shown in FIG. 11.

FIG. 14 shows a sequence identical to the one in FIG. 5 which illustrates Embodiment 1 with the exception that step S1502 exists between steps S501 and S502 and step S505 is replaced by step S1504.

In step S1502, the upper and lower limit values are read from the upper/lower limit value memory 1302 of the CPU module 1101 and transferred to the RAM 3202 of the peripheral device 1103, and the operation proceeds to step S502.

The processing progresses from step S503 to step S1504. In step 1504, it is judged by the peripheral device 1103 whether or not the input value in step S503 falls within the upper/lower limit value range stored beforehand in the RAM 3202. If it is within the range, the operation advances to step S506. If the value is outside the range, the execution moves to step S507.

In Embodiments 1, 2 and 3, keyword judging means is constituted by the corresponding ROM 201, 701 or 1201, the CPU 3201 and the RAM 3202.

In Embodiments 1, 2 and 3, it will be recognized that the timer and counter set values, etc., may be stored into the corresponding upper/lower limit value memory 202, 802 or 1302.

It is to be understood that Embodiments 1, 2 and 3 have a fail-safe function which disables set values from being written to unregistered devices. For example, if timers T1 to T5 and T10 to T13 have been registered beforehand, set values may be written to any registered timer, e.g., T2, but not to any unregistered timer, e.g., T7.

According to the prior art, when the set value of, for example, internal device T0 is being displayed on the conventional simple peripheral device, T, 1, G0 must be keyed in to display the contents of the next device number, and T, 2, G0 keyed in to display the further next device number, whereby the device name and device number are defined for each device, increasing the number of keystrokes and making operation more difficult. It is to be understood that T indicates a device name and 1 and 2 denote device numbers.

Embodiment 4 is designed to easily display the contents of consecutive device numbers sequentially.

Figure 15:
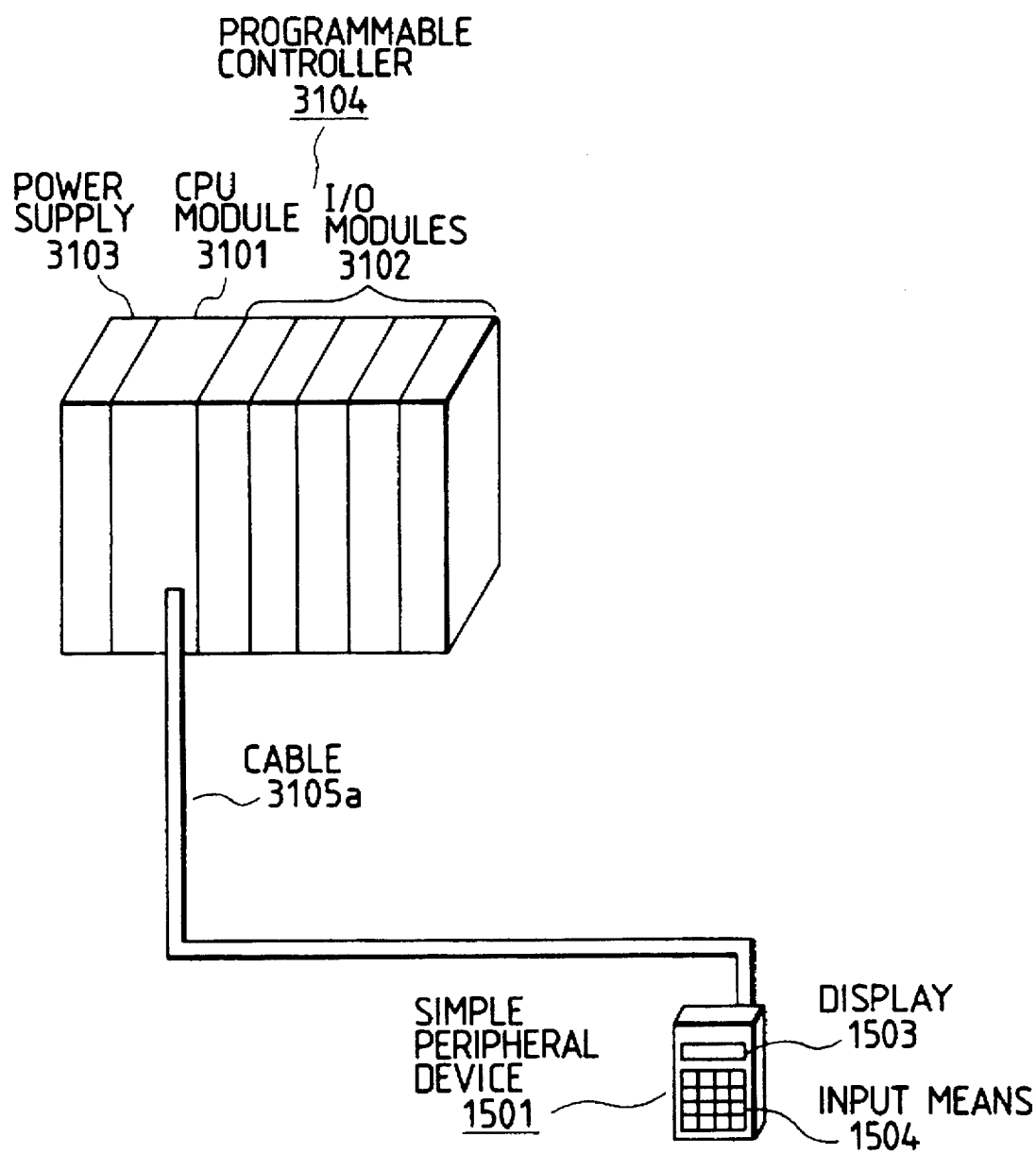
FIG. 15 is a perspective view illustrating the arrangement of a PC according to a further alternative preferred embodiment of the present invention.

FIG. 15 is a perspective view which shows the arrangement of a PC according to a further alternative embodiment of the present invention. In the drawing, 3101 to 3104 and 3105a indicate parts identical to those in FIG. 30 which shows the conventional example.

1501 denotes a simple peripheral device, 1503 represents a display section provided on the peripheral device 1501, and 1504 designates input means, e.g., an input section, provided on the peripheral device 1501. The cable 3105a connects the CPU module 3101 and the simple peripheral device 1501.

Figure 16:
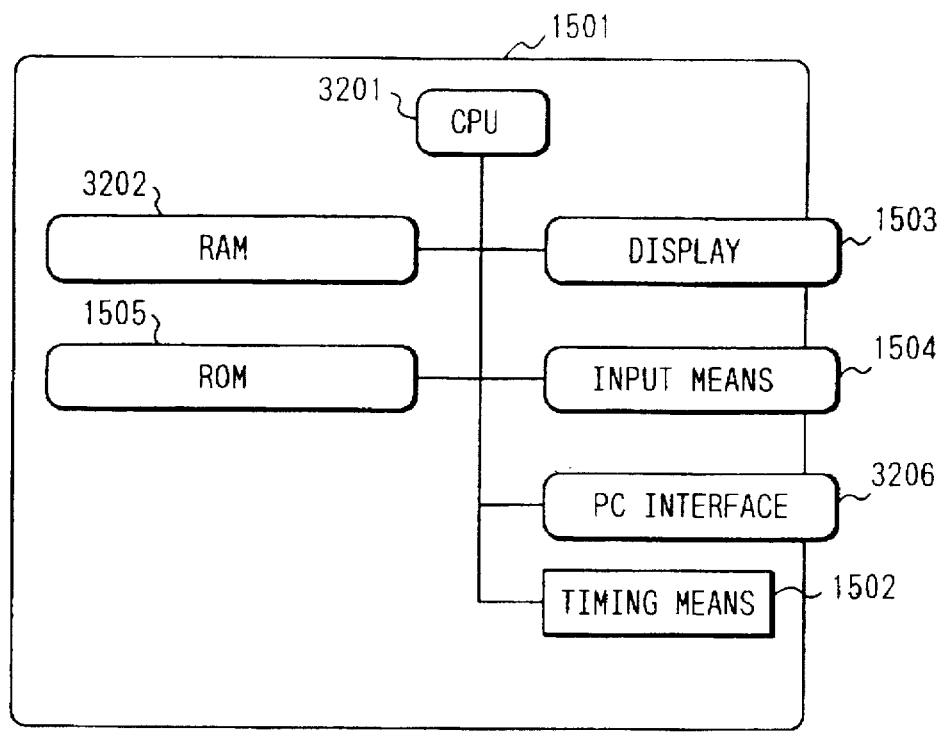
FIG. 16 is a block arrangement diagram of a peripheral device in FIG. 15.

FIG. 16 is a block arrangement diagram of the peripheral device 1501 in FIG. 15. In this drawing, 3201, 3202 and 3206 are identical to the parts in FIG. 31 which illustrates the conventional example. 1505 designates ROM. It is to be noted that this ROM 1505 is identical to the ROM 3203 shown in FIG. 31 with the exception that the contents stored therein are different from each other. 1502 denotes timing means which determines display intervals, e.g., a display interval timer.

Display means is constituted by the display section 1503, the CPU 3201, the RAM 3202, the ROM 1501, the PC connecting interface 3206, the cable 3105a, the peripheral device connecting interface 3305, the CPU 3301, the RAM 3302 and the ROM 3303.

Figure 17:
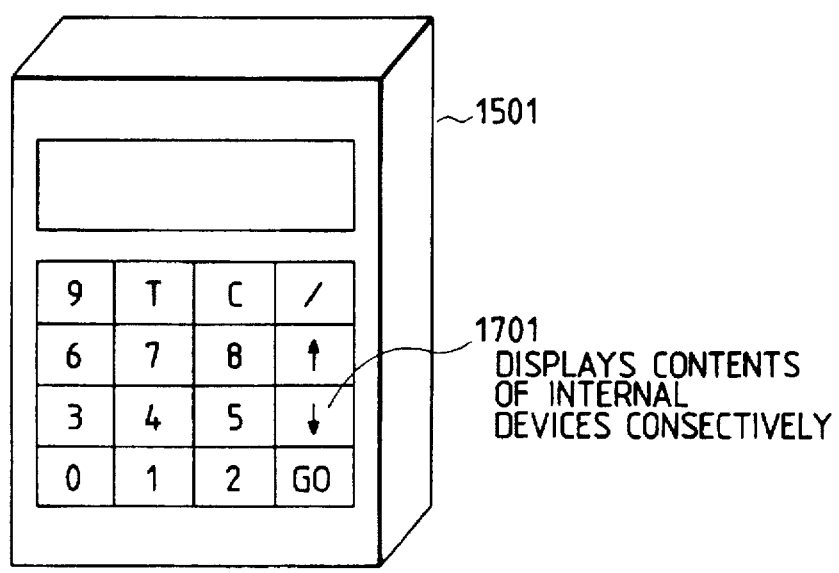
FIG. 17 is an expanded perspective view of the peripheral device in FIG. 15.

FIG. 17 is an expanded perspective view of the simple peripheral device 1501. The simple peripheral device 1501 has a key 1701 on which a downward arrow "↓" is indicated. It is to be understood that the key 1701 is employed to enter a directive to display the contents of internal devices consecutively.

It should be noted that the contents of the internal devices need to be displayed when the operator checks the internal device contents such as timer and counter set values.

Figure 18:
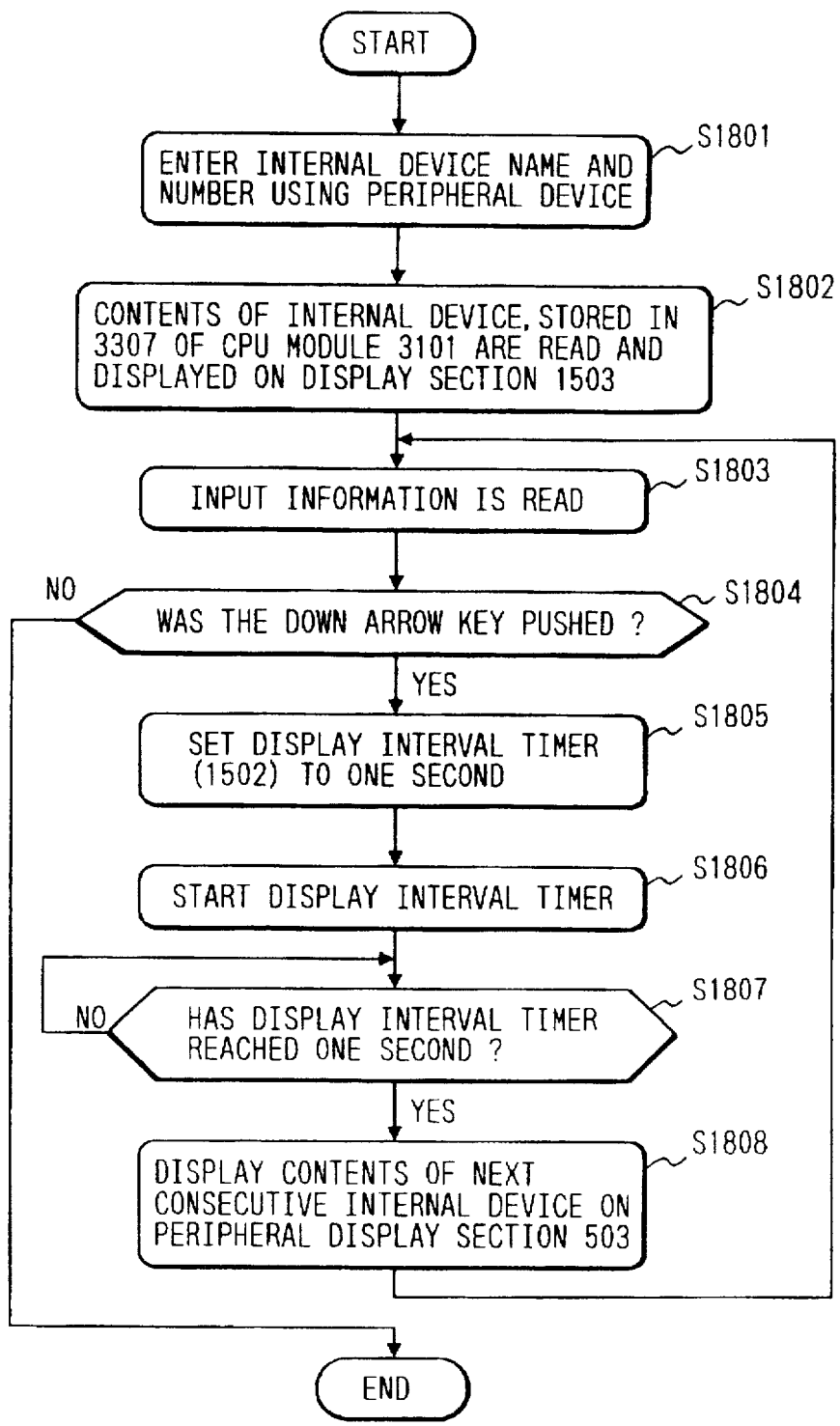
FIG. 18 is a flowchart illustrating the consecutive display operation of device contents in the PC shown in FIG. 15.

An operation which consecutively displays device contents according to this embodiment will now be described in accordance with the flowchart in FIG. 18.

In step S1801, the operator enters the device name and device number of a desired internal device from the peripheral device 1501 and the operation moves to step S1802.

In step S1802, the contents of the internal device, such as the timer or counter set value, stored in the device memory 3307 of the CPU module 3101 are read via the PC connecting interface 3206, the read data is displayed on the display section 1503, and the execution progresses to step S1803.

In step S1803, the keyed-in information entered from the input section 1504 is read and the processing advances to step S1804.

In step S1804, it is judged whether or not the data read in step S1803 is consecutive display information indicating that the key 1701 has been pressed. If it is consecutive display information, the operation goes forward to step S1805. If the data is not consecutive display information, the operation is terminated.

In step S1805, the display interval timer 1502 is set to 1 second and the execution proceeds to step S1806.

In step S1806, the display interval timer 1502 is started and the processing progresses to step S1807.

In step S1807, it is judged whether or not the current value of the display interval timer 1502 has reached 1 second as set in step S1805. If 1 second has not yet been reached, the operation returns to step S1807. If it has been reached, the processing advances to step S1808. In step S1808, the contents of the internal device subsequent to the one currently displayed are shown on the display section 3106 as in step S1802 and the execution returns to step S1803. In the above manner, the contents of the internal devices are displayed in succession on the display section 1503 every second. It is to be noted that the operation shown in FIG. 18 is conducted under the control of a program stored in the ROM 1505.

In Embodiment 4, the time required to display the contents of the internal devices is one second per device. For example, 100 seconds are required to display the contents of internal devices T0 to T100 consecutively Embodiment 5 is designed to reduce this time without inhibiting its ease of use.

The perspective view of a PC, the block diagram of a peripheral device and the expanded perspective view of an input section in Embodiment 5 are identical to those in FIGS. 15, 16 and 17 in Embodiment 4. It is to be understood that the ROM 1505 may be provided with either or both of the programs needed for Embodiments 4 and 5.

An operation for displaying the contents of internal devices consecutively according to this embodiment will now be described in accordance with the flowcharts in FIGS. 19 and 20.

Figure 19:
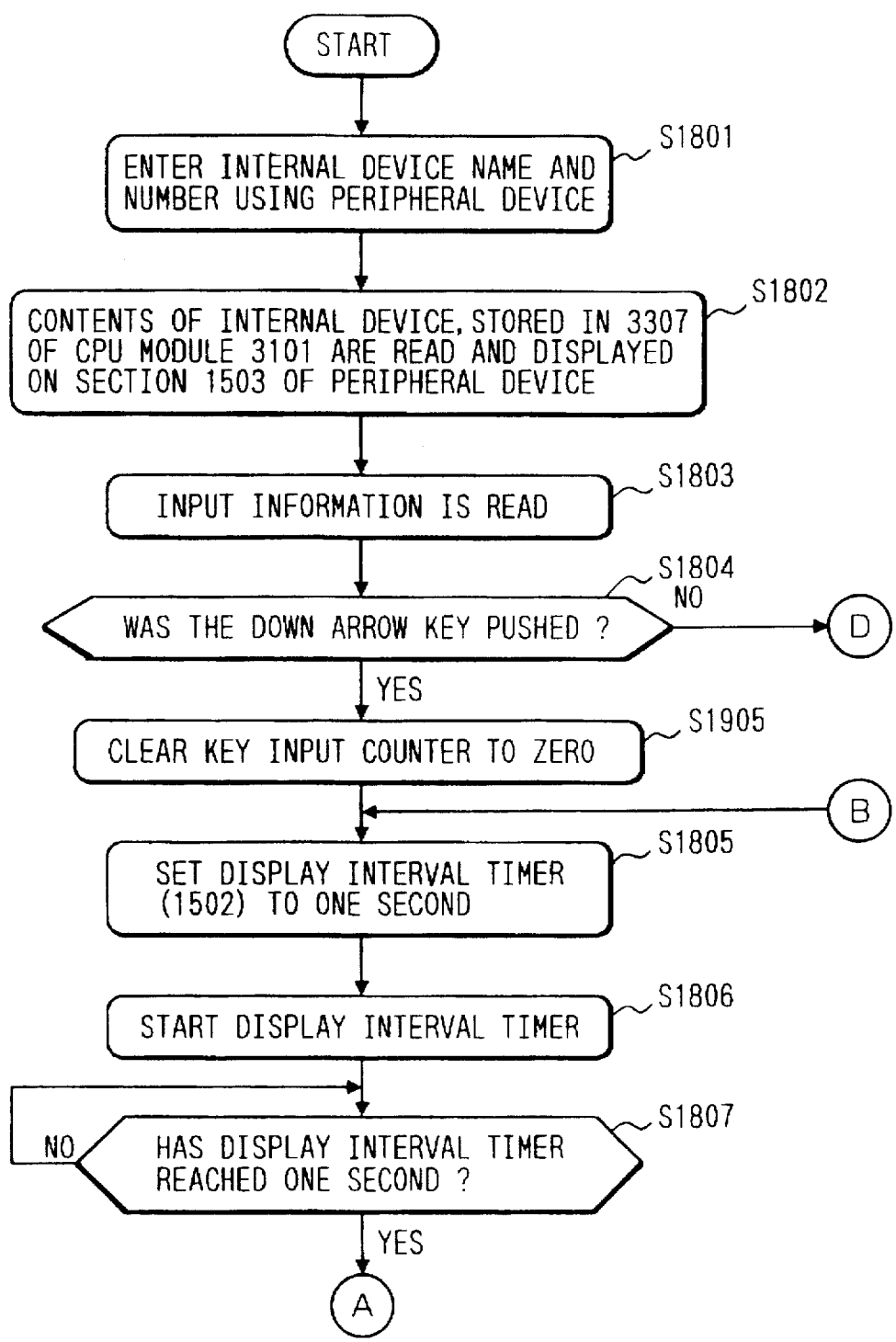
FIG. 19 is a flowchart illustrating the high-speed consecutive display operation of the device contents in the PC shown in FIG. 15.
Figure 20:
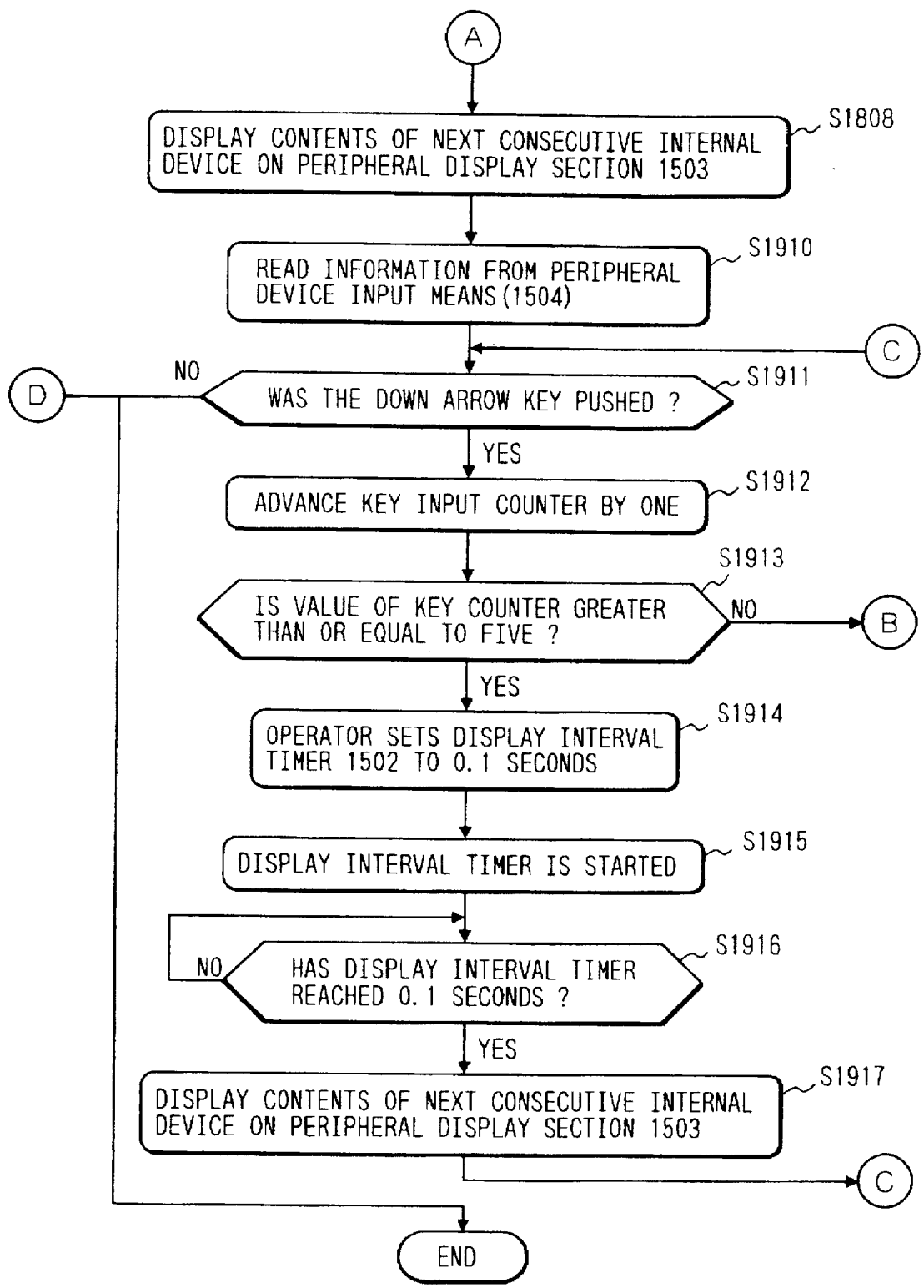
FIG. 20 is a flowchart illustrating the high-speed consecutive display operation of the device contents in the PC shown in FIG. 15.

FIGS. 19 and 20 are identical to FIG. 18 of Embodiment 4 with the exception that step S1905 is present between steps S1804 and S1805 and steps S1910 to S1917 are executed subsequently to step S1808.

In step S1905, if the information read in step S1803 indicates that the internal device contents are to be displayed consecutively, a key input counter is cleared to zero, and the execution progresses to step S1805.

In step S1910, the keyed-in information entered from the input section 1504 is read and the processing advances to step S1911.

In step S1911, it is judged whether or not the data read is consecutive displayed information indicating that the key 1701 has been pressed. If it is consecutive display information, the operation moves to step S1912. If the data is not consecutive display information, the operation proceeds to end step S1918.

In step S1912, the key input counter is incremented by 1 and the execution goes forward to step S1913.

In step S1913, it is judged whether the value of the key counter is less than 5. If it is less than 5, the execution returns to step S1805. If the value is 5 or more, the processing advances to step S1914.

In step S1914, the operator sets the display interval timer 1502 to a short time period, e.g. 0.1 seconds, and the execution proceeds to step S1915.

In step S1915, the display interval timer 1502 is started and the processing progresses to step S1916.

In step S1916, it is judged whether the current value of the display interval timer 1502 has reached 0.1 seconds as set in step S1914. If 0.1 seconds have not yet been reached, the operation returns to step S1916. If 0.1 seconds have been reached, the processing progresses to step S1917.

In step S1917, the contents of the internal device subsequent to the one currently displayed are shown on the display section 1503 as in step S1802 and the execution returns to step S1911. When the contents of internal devices T0 to T100 have been displayed consecutively in the above operation shown in FIGS. 19 and 20, the time required for the display is 14.5 seconds.

Since the set values and the like of the PC internal devices of the conventional PC could only be displayed in binary, octal, decimal and hexadecimal formats in the monitoring function of the conventional simple peripheral device, another display (not shown) was needed that could display character information, in addition to the simple peripheral device, to display such character information. It was also necessary for the operator to use the internal devices to write a display program.

According to a sixth embodiment of the invention, the internal device contents of the PC, e.g., character information stored as set values and represented numerically, can be displayed in characters on the simple peripheral device 1501 without requiring another display to be connected or the display program to be rewritten.

Figure 21:
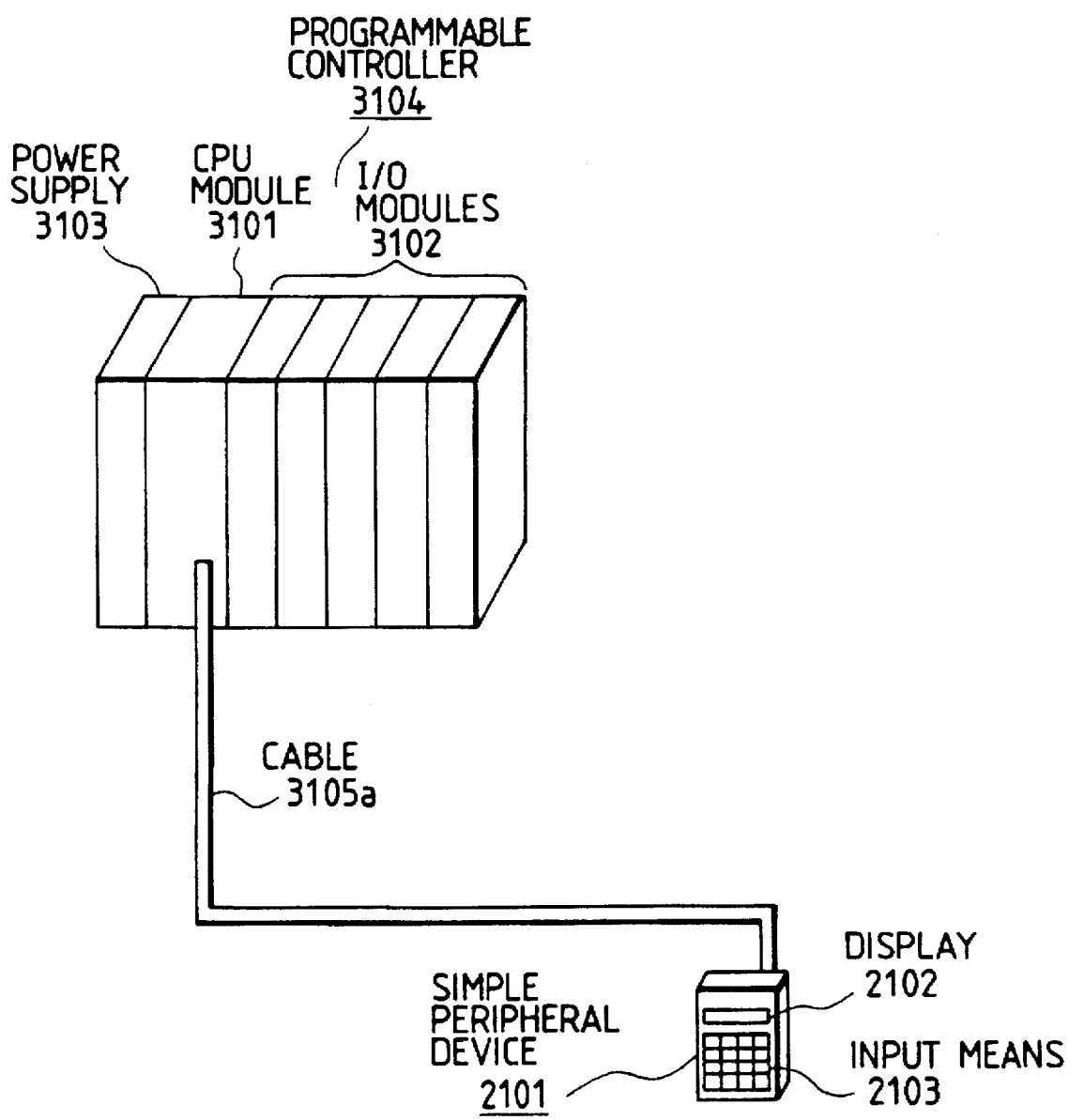
FIG. 21 is a perspective view illustrating the arrangement of a PC according to a further alternative preferred embodiment of the present invention.

FIG. 21 is a perspective view showing the arrangement of a PC according to this embodiment. In this drawing, 3101 to 3104 and 3105a are identical to the parts in FIG. 30 which illustrates the conventional example.

2101 indicates a simple peripheral device, and 2102 and 2103 designate a display section and an input section provided on the peripheral device 2101 respectively. The cable 3105a connects the CPU module 3101 and the simple peripheral device 2101.

Figure 22:
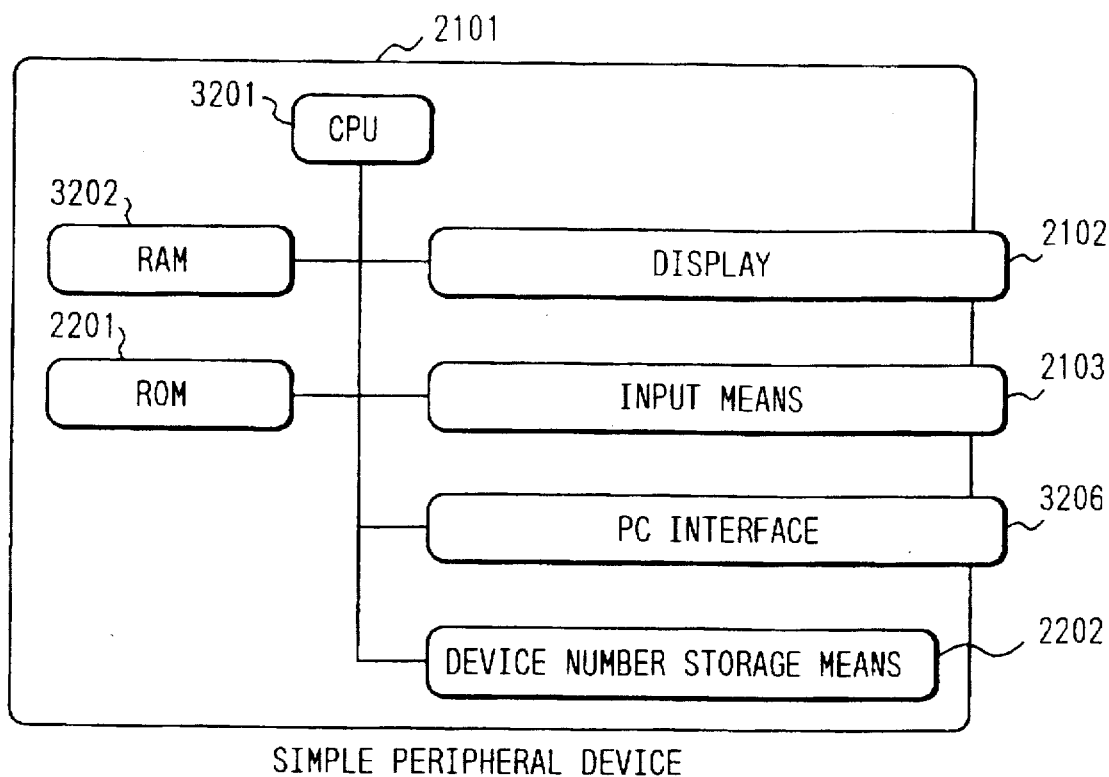
FIG. 22 is a block diagram illustrating the arrangement of a peripheral device in FIG. 21.

FIG. 22 is a block arrangement diagram of the peripheral device 2101 in FIG. 21. In this drawing, 3201, 3202 and 3206 are identical to the parts in FIG. 31 which illustrates the conventional example. 2201 denotes ROM. It is to be noted that this ROM 2201 is identical to the ROM 3203 shown in FIG. 31 with the exception that the contents stored therein are different from each other. 2202 represents device number storage means which stores device numbers, e.g., a device number storage memory.

The display means is constituted by the display section 2102, the CPU 3201, the RAM 3202, the ROM 2201, the PC connecting interface 3206, the cable 3105a, the peripheral device connecting interface 3305, the CPU 3301, the RAM 3302 and the ROM 3303.

Figure 23:
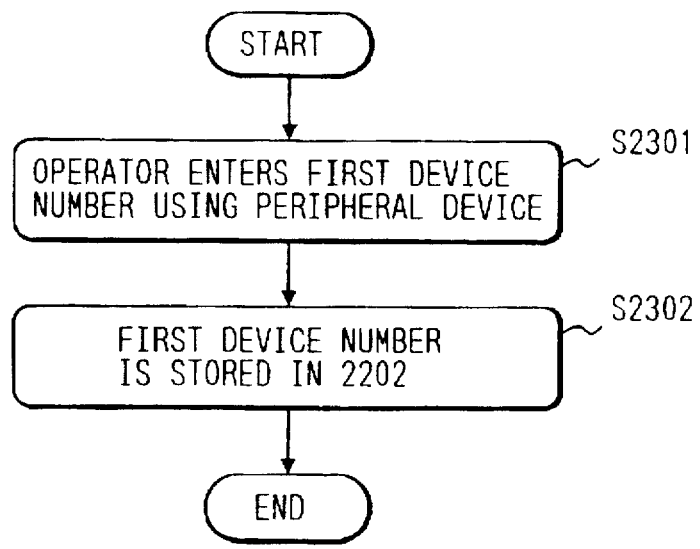
FIG. 23 is a flowchart illustrating a procedure for storing a first device number for the consecutive display of the contents of internal devices in the PC shown in FIG. 21.

A procedure for pre-registering a first device number to the device number storage memory 2202 to display the contents of the internal devices consecutively on the display section 2102 of the peripheral device 2101 will now be described in accordance with the flowchart shown in FIG. 23.

In step S2301, the operator enters the first device number from the input section 2103 and the operation proceeds to step S2302.

In step S2302, the data entered in step S2301 is written to the device number storage memory 2202 and the registration is terminated.

Figure 24:
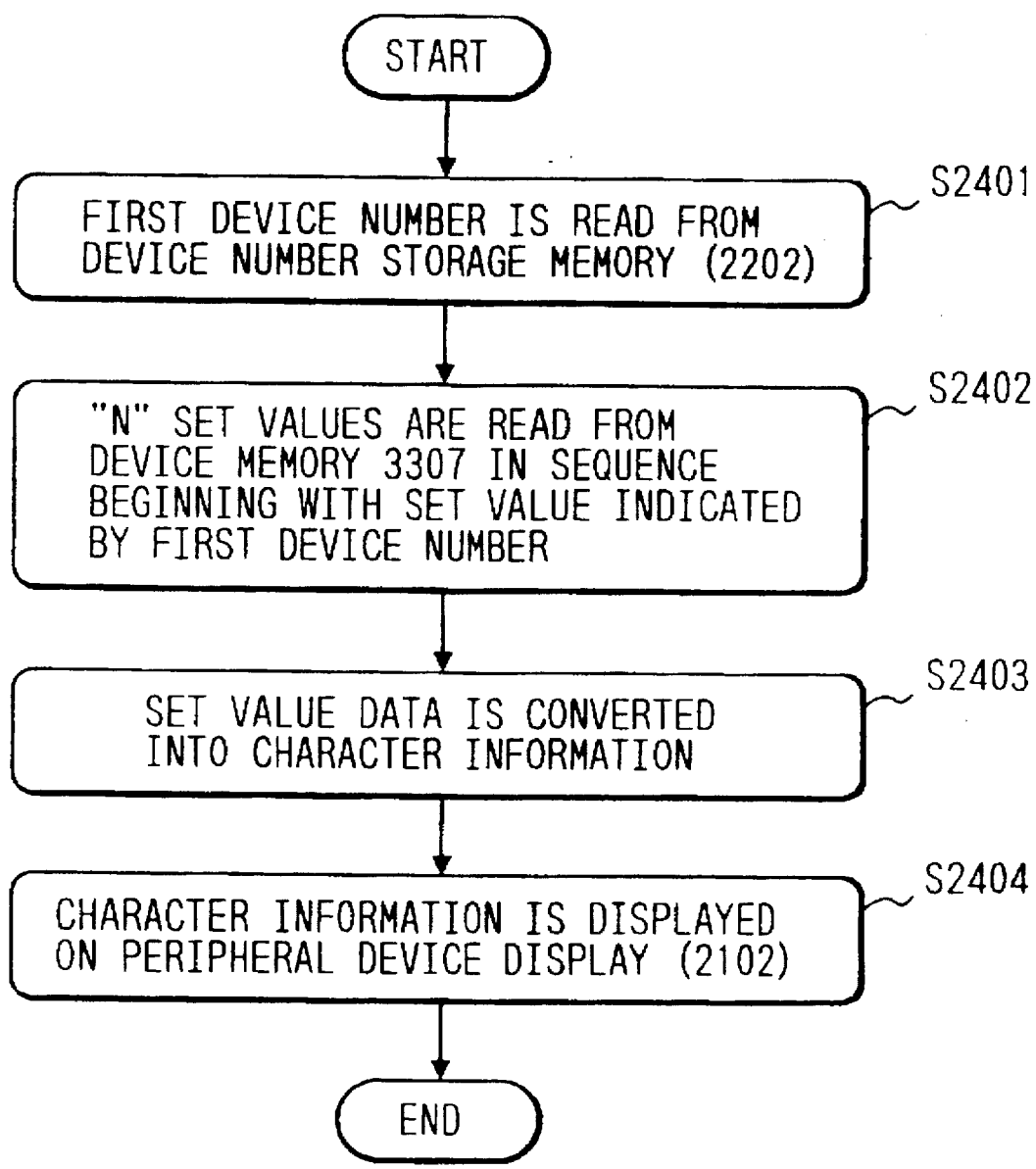
FIG. 24 is a flowchart illustrating an operation of displaying the contents of the internal devices consecutively in the PC shown in FIG. 21.

An operation for displaying the contents of the internal devices consecutively on the display section 2102 of the peripheral device 2101 will now be described in accordance with the flowchart shown in FIG. 24.

In step S2401, the first device number is read from the device number storage memory 2202 and the operation progresses to step S2402. It is to be understood that the device memory 3307 is stored beforehand with numerically represented character information as set values, etc.

In step S2402, "n" set values are read from the device memory 3307 in sequence, beginning with the set value indicated by the first device number, and the execution advances to step S2403.

In step S2403, the data read in step S2402 is converted into character information which indicates character shapes, and the processing progresses to step S2404.

In step S2404, the character information converted in step S2403 is displayed on the display section 2102 in sequence and the operation is terminated.

According to Embodiment 6, the character information displayed must be stored in the device memory 3307 consecutively in the order of display. To add new display data partway in the memory contents, therefore, the contents of the device memory 3307 must be reallocated, requiring tremendous labor.

According to a seventh embodiment, character information to be displayed can be stored into the device memory 3307 in a sequence independent of the display sequence, whereby new display data can be easily added partway in the memory contents.

The perspective view of the PC and the peripheral device 2102 in this embodiment is identical to the one in FIG. 21 of Embodiment 6, and the block arrangement diagram of the peripheral device 2101 is identical to the one in FIG. 22 of Embodiment 6.

Figure 25:
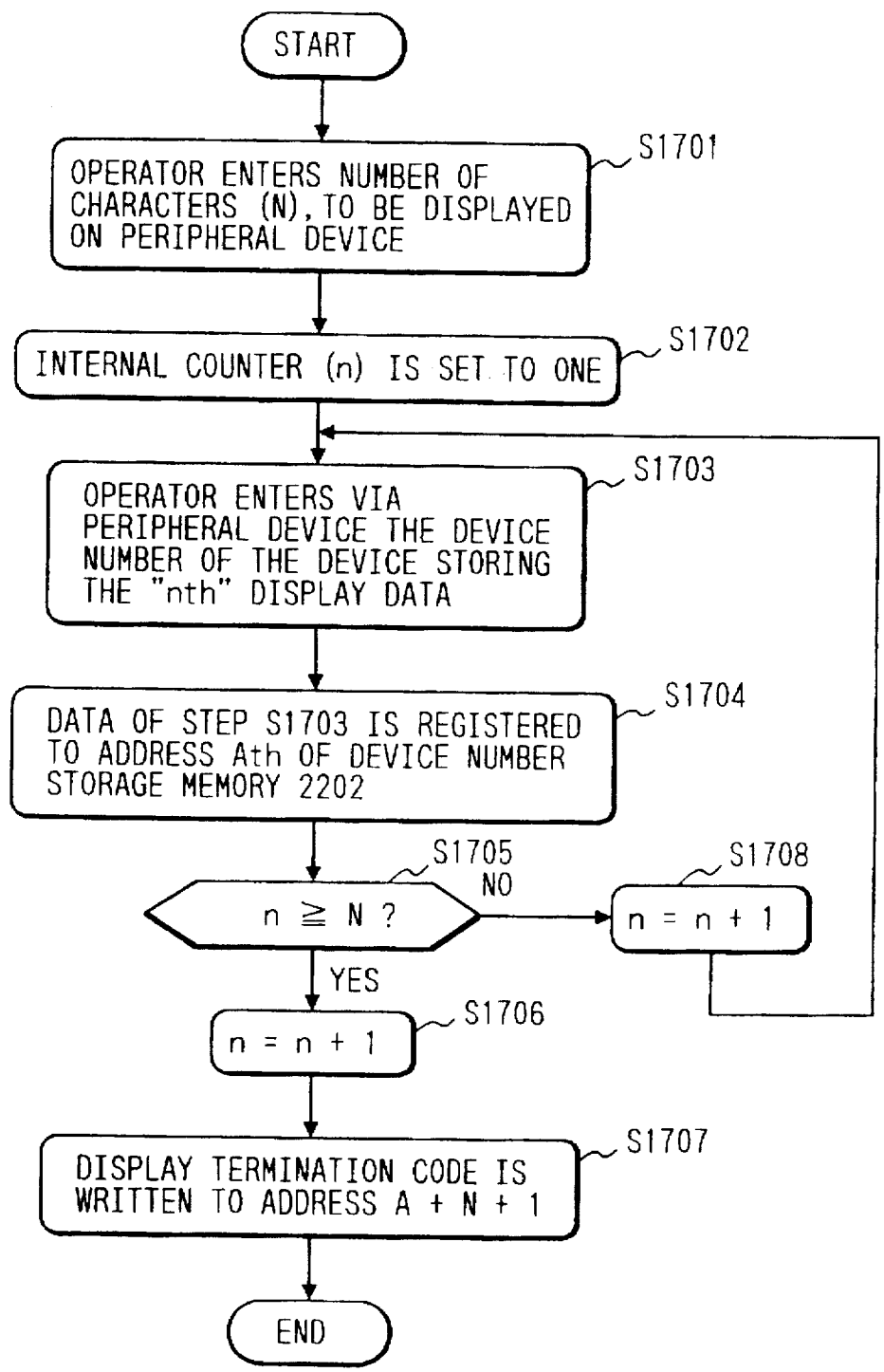
FIG. 25 is a flowchart illustrating an operation of registering the device numbers of devices to be displayed in a further preferred embodiment of the present invention.

FIG. 25 is a flowchart which illustrates the sequence of the device number registration operation to the device number storage memory 2202 in the peripheral device 2102 of Embodiment 7.

Figure 26:
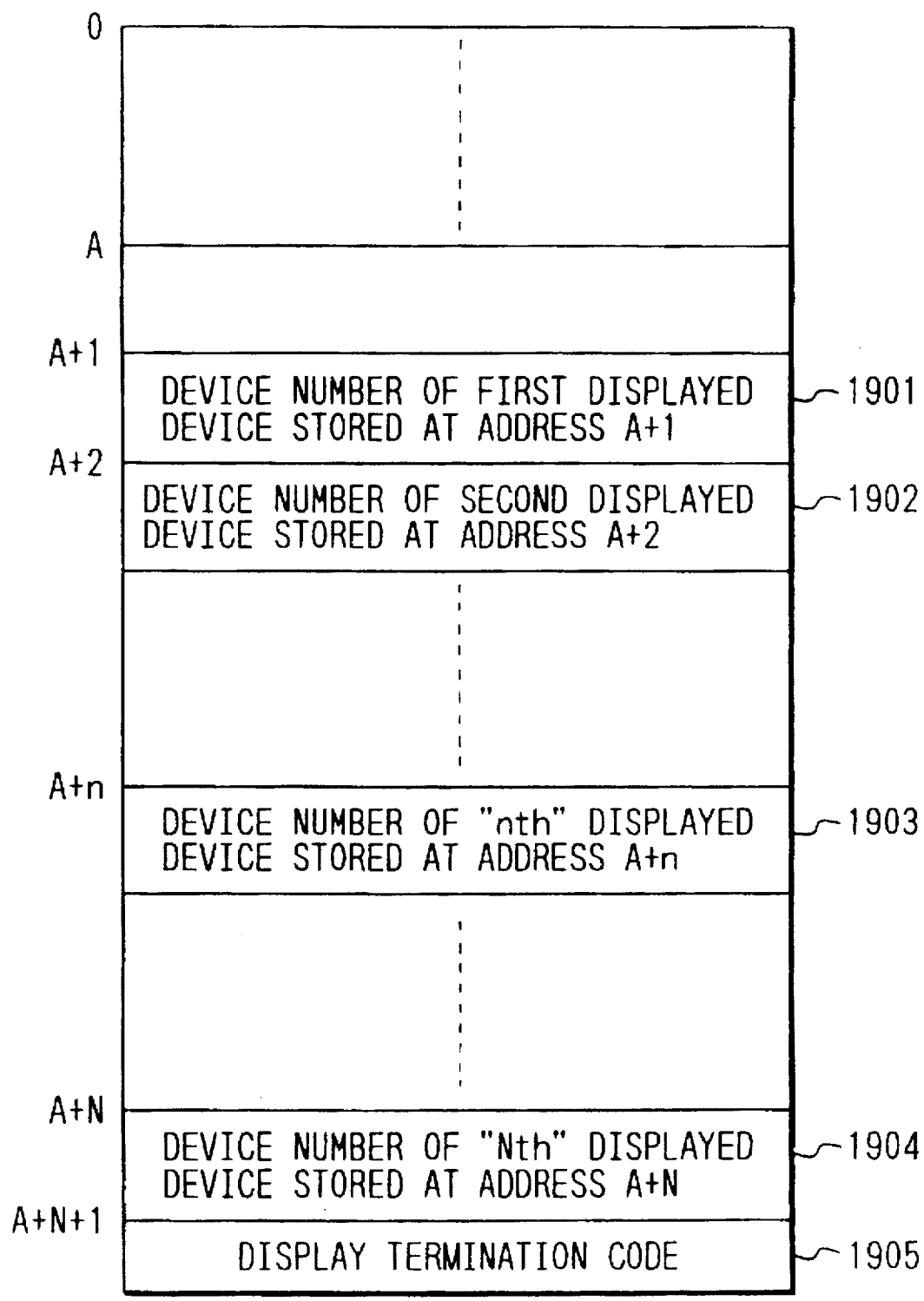
FIG. 26 illustrates the storage contents of device number storage memory where device numbers are registered in the flowchart in FIG. 25.

FIG. 26 shows an example of the contents stored in the device number storage memory 2202 after said registration operation has been conducted.

In FIG. 26, 1901 indicates a device number of a first displayed device stored at address A+1. 1902 denotes a device number of a second displayed device stored at address A+2. 1903 represents a device number of an "n"th displayed device stored at address A+n. 1904 designates a device number of an "N"th displayed device stored at address A+N. 1905 indicates a display termination code stored at address A+N+1. It is to be understood that A denotes an offset address. In this drawing, n is 2nN because the device number 1901 of the first displayed device and the device number 1902 of the second displayed device are shown.

The registration operation of device numbers to the device number storage memory 2202 will now be described according to FIG. 25.

In step S1701, the number of characters N to be displayed on the display 2102 is entered from the input section 2103 by the operator and the operation proceeds to step S1702.

In step S1702, the value n of an internal counter is set to 1 and execution advances to step S1703.

In step S1703, the operator enters via the input section 2103 the device number of the device storing the "n"th display data, and the operation goes forward to step S1704.

In step S1704, the data entered in step S1703 is registered to address A+n of the device number storage memory 2202 and the execution proceeds to step S1705. It is to be understood that A indicates an offset address as described above.

In step S1705, it is judged whether n is equal to N. If n and N are not equal, the value n of the internal counter is incremented by 1 and the processing progresses to step S1708. If n is equal to N, the value n of the internal counter is incremented by 1 and the operation advances to step S1707.

If the operation has proceeded to step S1708, it returns to step S1703.

If the operation has moved to step S1707, the display termination code is written to address (A+N+1) and the registration processing is completed.

A display operation on the display section 2102 in accordance with the storage contents of the device number storage memory 2202 will now be described according to an operation flowchart shown in FIG. 27.

In step S2801 of the drawing, the value n of the internal counter is set to 1 and the execution proceeds to step S2802.

In step S2802, the device number at address (A+n) of the device number storage memory 2202 is read and the operation advances to step S2803.

In step S2803, it is judged whether the data read in step S2802 is the display termination code. If it is the display termination code, the display operation is ended. If it is not the display termination code, the data which was read is the device number and the processing goes on to step S2804.

In step S2804, the data of the device memory 3307, e.g., the set value, indicated by the device number read in step S2803 is read and the operation proceeds to step S2805. It is to be noted that the data is read from the device memory 3307 via the PC connecting interface 3206 since the device memory 3307 exists in the CPU module 3101. It is also to be noted that the set value is read as numerical information.

In step S2805, the set value which was read is converted into character information which indicates a character shape, and the processing advances to step S2806.

In step S2806, the character information is displayed on the display section 2102 and the execution progresses to step S2807.

In step S2807, the value n of the internal counter is incremented by 1 and the operation returns to step S2802.

Figure 27:
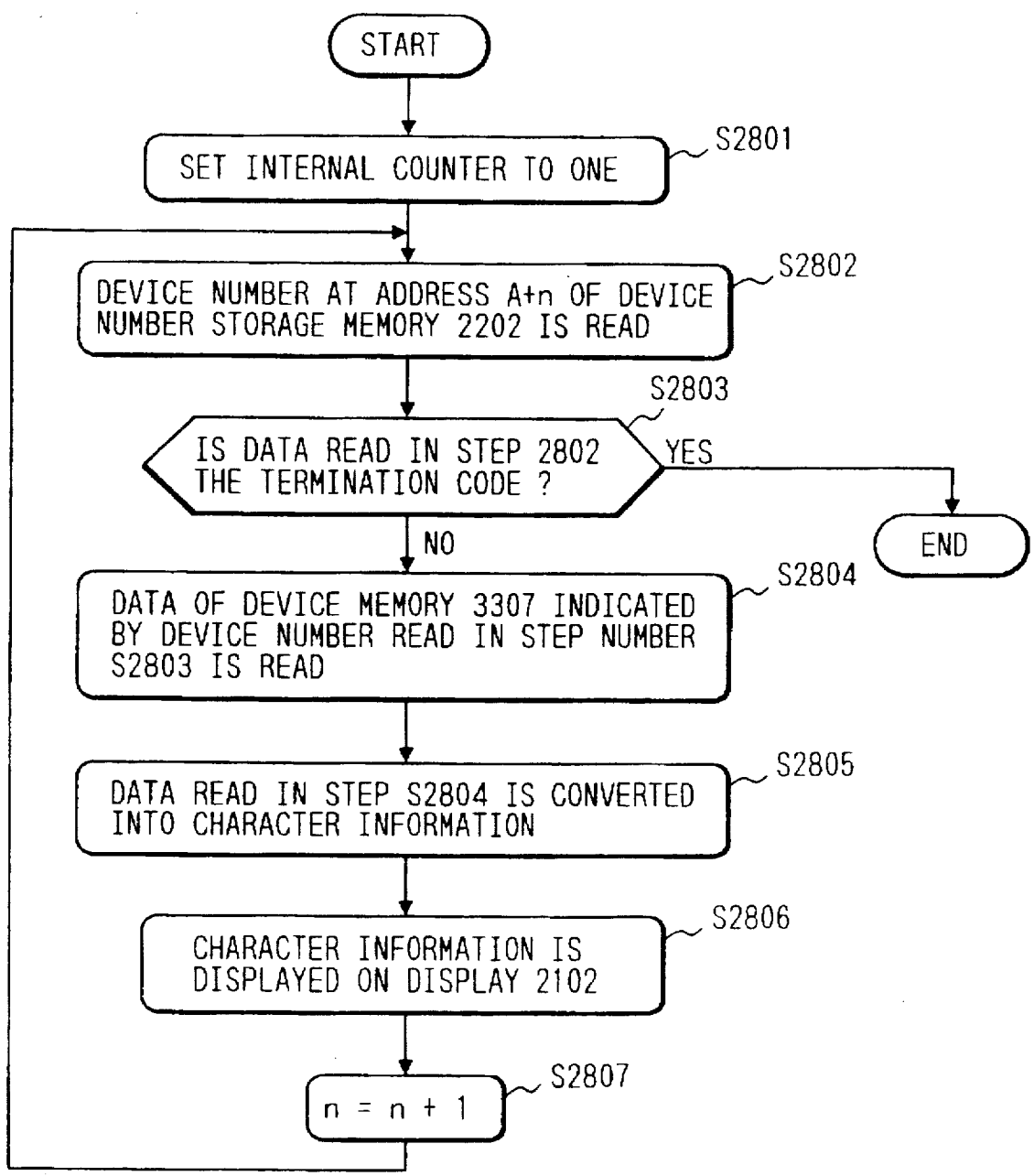
FIG. 27 is a flowchart illustrating a display operation according to the storage contents of the device number storage memory shown in FIG. 26.

As shown in FIG. 27, the operation in steps S2802 to S2807 is repeated until it is judged that the data read in step S2803 is the display termination code.

Since the simple peripheral device also performs a display operation in the monitoring mode, it is necessary to cause the function of the simple peripheral device to switch between its operation as a display in the monitoring mode and its operation as a character information display. When the character information display operation has been selected, the alarm information or various character information of the PC can be displayed. When the display operation in the monitoring mode has been selected, however, this information cannot be displayed. To display this information, the operator must switch the setting of the simple peripheral device to select the character information display operation.

For example, assume that registered message "BOILER TEMPERATURE ALARM" is present in the internal device memory and a temperature sensor provided in a boiler has detected unusually high temperature. Even in this case, if the character information display operation had not been selected, this message would not be displayed and emergency information could not be transmitted to a user in real time.

An eighth embodiment of the invention is therefore arranged so as to display such emergency information in real time if the display operation in the monitoring mode has been selected.

The perspective view of the PC and the peripheral device 2101 in this embodiment is identical to the one in FIG. 21 in Embodiment 6 and the block arrangement diagram of the peripheral device 2101 is identical to the one in FIG. 22 in Embodiment 6.

Figure 28:
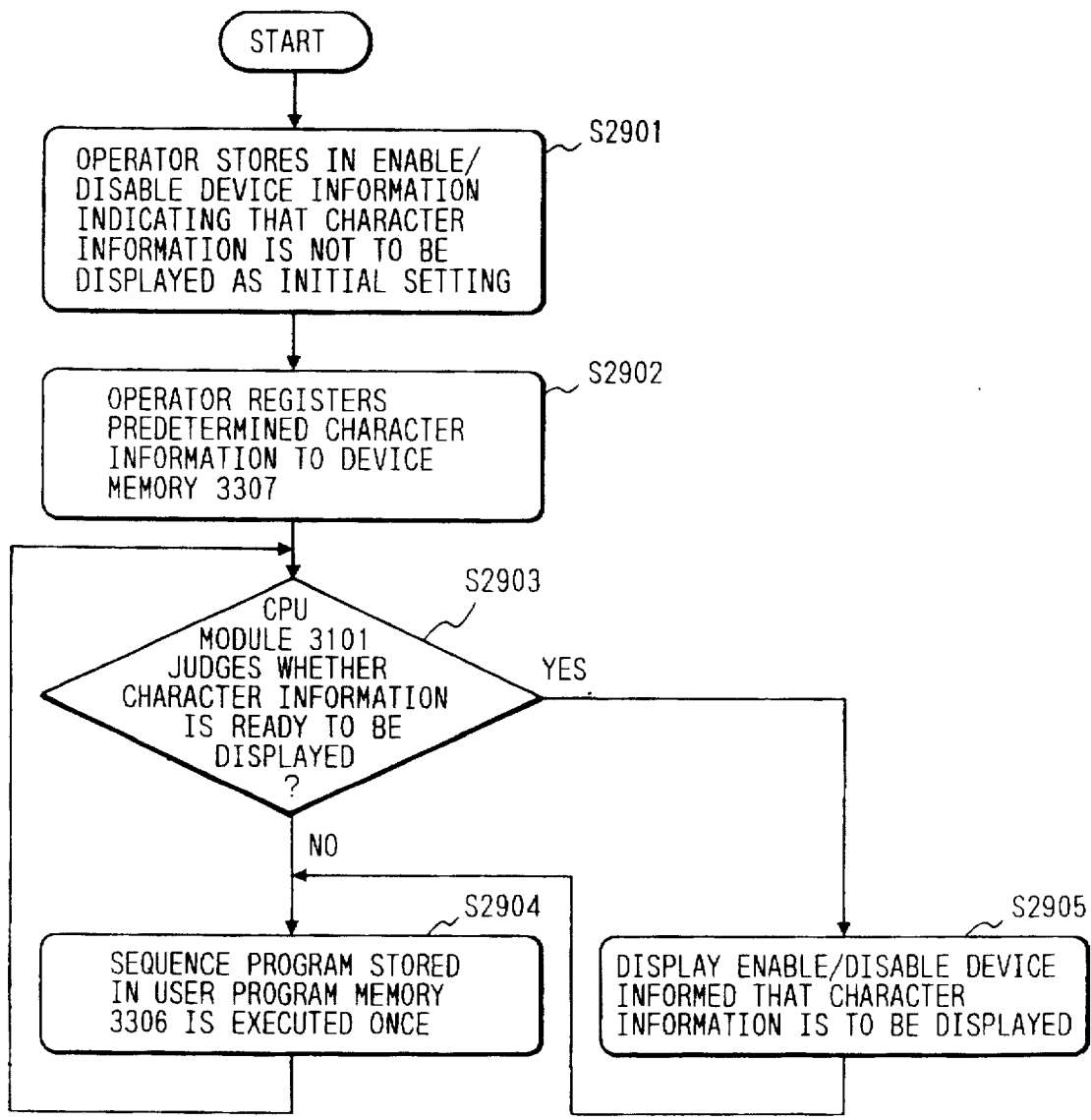
FIG. 28 is a flowchart illustrating the operation of a PC unit in a further preferred embodiment of the present invention.

First, an operation for storing information, which indicates whether or not character information is to be displayed into a character information display enable/disable device, or the specific device of the device memory 3307 in the CPU module 3101, will now be described in accordance with an example of operation as depicted in the flowchart of FIG. 28.

In step S2901, the operator stores as an initial setting into the character information display enable/disable device the information which indicates that character information is not to be displayed, and the operation proceeds to step S2902.

In step S2902, the operator registers predetermined character information to the device memory 3307 and the processing advances to Step S2903. It is to be understood that the character information is registered in character code, such as ASCII and JIS. In this example, the information is "BOILER ALARM", it is registered in JIS and it is used to indicate that a boiler fault has occurred.

In step S2903, it is judged by the CPU module 3101 whether or not the character information registered is ready to be displayed. If it is ready, the processing progresses to step S2905. If it is not ready, the execution proceeds to step S2904. In this example, it is assumed that the character information is ready to be displayed if the boiler is faulty according to the detection output of the unusual temperature sensor in the boiler and that the character information is not ready to be displayed if the boiler is normal.

In step S2905, the information indicating that the character information is to be displayed is stored in the character information display enable/disable device and the operation goes on to step S2904.

In step S2904, the sequence program stored in the user program memory 3306 is executed once and the operation then returns to step S2903.

Figure 29:
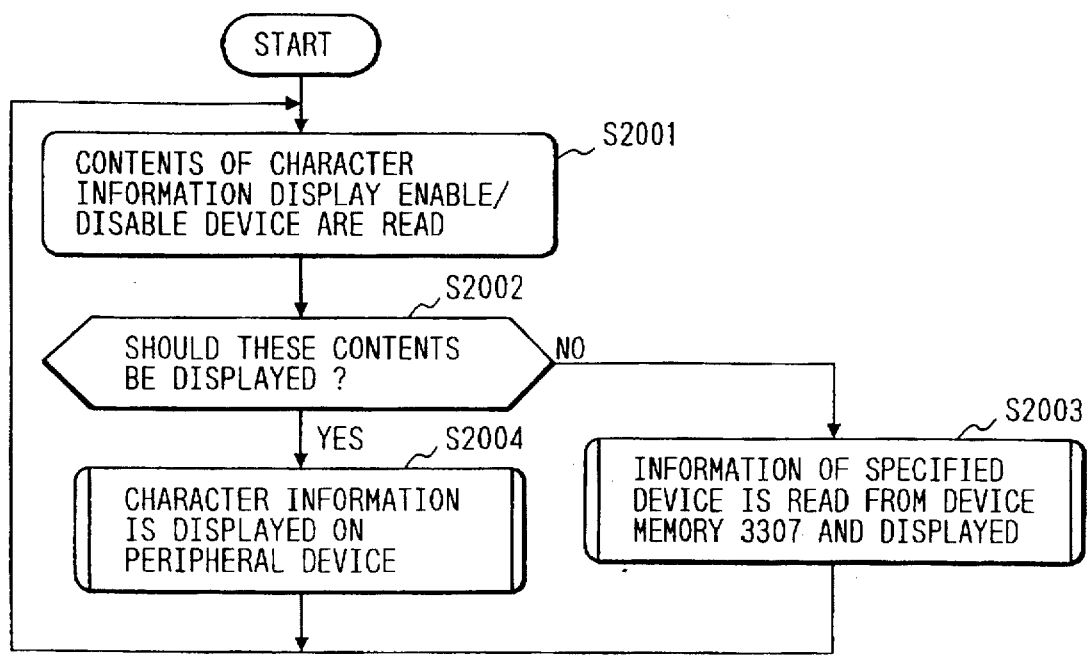
FIG. 29 is a flowchart illustrating the operation of a peripheral device in the PC whose PC unit operation sequence is shown in FIG. 28.
Figure 33:
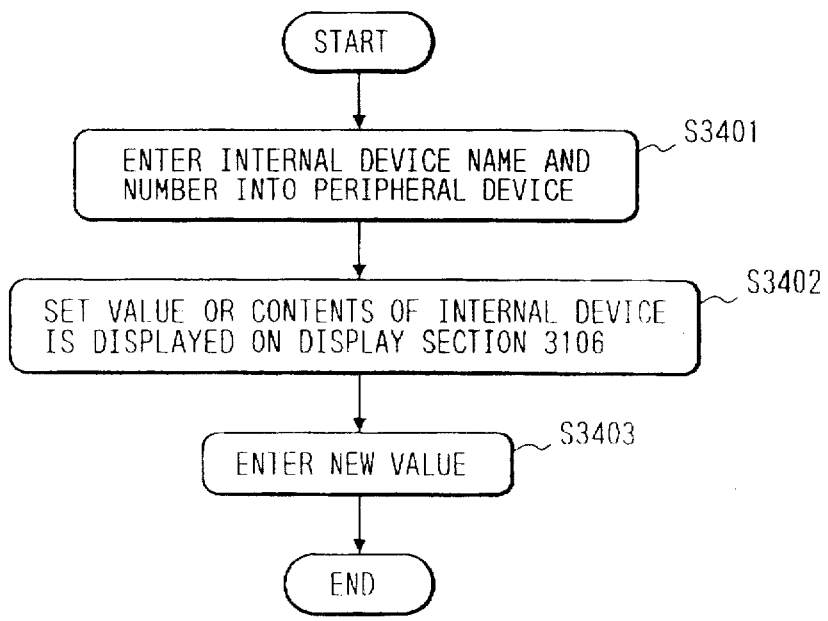
FIG. 33 is a flowchart illustrating the operation of changing the contents of internal devices in the conventional PC.

The operation of the peripheral device 2101 will now be describe in accordance with the flowchart shown in FIG. 29.

It is assumed that the information indicating whether or not the character information is to be displayed has been stored beforehand in the character information display enable/disable device as described above.

In step S2001, the contents of the character information display enable/disable device are read and the execution proceeds to step S2002.

In step S2002, it is judged whether or not the contents of the character information display enable/disable device indicate that the character information is to be displayed. If the character information is to be displayed, the processing advances to step S2004. If the character information is not to be displayed, the operation proceeds to step S2003.

In step S2003, the information, e.g., set value, of the specified device is read from the device memory 3307 and displayed, and the operation returns to step S2001.

In step S2004, the character information is shown on the display section 2102 as in Embodiment 6 or 7 and the operation returns to step S2001.

In Embodiments 1 to 8, the sequence program may be written not only in ladder language but in any control language. Input/output control may either be exercised in a direct mode wherein input information from outside the PC is reflected as soon as the sequence program runs or in a refresh mode wherein said input information is reflected after the END processing of the sequence program is executed once.

Also, the simple peripheral device employed in Embodiments 1 to 8 may be replaced by the large-sized peripheral device 3108 which uses a CRT display device or the like, if disadvantages such as bulkiness are not taken into consideration.

Further, the input section of the simple peripheral device in Embodiments 4 to 8, which has only the numeral keys and function keys, may also have character keys.

It will be apparent that the upper and lower limit values of the set values of PC internal devices, such as timers and counters, are registered into the upper/lower limit value storage means of a peripheral device in the present invention as described above, whereby connecting one peripheral device to a plurality of PC units and defining the set values of the PC internal devices, such as the timers and counters, allows the plurality of PC units to be sequentially set under the same upper/lower limit value conditions and to be easily set and managed under the same conditions.

It will also be apparent that the upper and lower limit values of the set values of PC internal devices, such as timers and counters, are registered into the upper/lower limit value storage means of a PC, whereby connecting a single peripheral device to a plurality of PC units and sequentially defining the set values of the PC internal devices, such as the timers and counters, allows the plurality of PC units to be sequentially set under upper/lower limit value conditions specific to the respective PC units and to be set and managed under the specific conditions easily.

It will also be apparent that the upper and lower limit values of the set values of PC internal devices, such as timers and counters, are registered into the upper/lower limit value storage means of a PC and judging means provided in a peripheral device judges whether or not the entered set value of the PC internal device, such as the timer or counter, lies within the upper/lower limit value range, whereby connecting a single peripheral device to a plurality of PC units and defining the set values of the PC internal devices, such as the timers and counters, allows the plurality of PC units to be set sequentially under upper/lower limit value conditions specific to the respective PC units and to be set and managed under the specific conditions easily and permits the processing load of the PC units to be reduced.

It will also be apparent that the contents of the internal devices are displayed consecutively by a predetermined command from the keyboard, whereby a consecutive display operation can be performed easily and the contents of a multiplicity of internal devices can be easily checked.

It will also be apparent that the contents of the internal devices are displayed consecutively at high speed, first at long intervals, then at short intervals, by a predetermined command from the keyboard, whereby the contents of a multiplicity of internal device can be checked in a short time by a simple operation.

It will also be apparent that the contents of the internal device specified by the first device number in the internal information storage means and those of a predetermined number of internal devices subsequent to said internal device can be displayed by a peripheral device sequentially in the form of characters, whereby character information can be easily displayed.

It will also be apparent that a predetermined number of device numbers stored beforehand in the device number storage means can be read sequentially and the contents of the internal information storage means specified by said data can be displayed by a peripheral device sequentially in the form of characters, whereby the displayed data can be edited easily and character information can be easily displayed.

It will further be apparent that whether or not the predetermined contents of the internal information storage means are to be displayed is judged according to the contents of the specific internal device in said internal information storage means, whereby character information can be easily displayed in real time.

What is claimed is:

1. A programmable controller including internal information storage means for storing predetermined internal information relating to a plurality of devices that each have an address, said programmable controller being equipped with a programmable controller unit and a peripheral device operating under the control of a sequence program, said programmable controller comprising:

timing means;

input means; and display means for reading and displaying sequentially and individually the information relating to said devices stored in said internal information storage means by sequentially changing read addresses that correspond to said devices at a first predetermined interval for a first predetermined number of read addresses and at a second predetermined interval for said read addresses following said first predetermined number of read addresses based on the timing output of said timing means according to a predetermined directive entered from said input means.

2. The programmable controller as defined in claim 1, further comprising a plurality of timing means, and wherein the display means reads and displays sequentially the information in said internal information storage means by changing the read addresses at predetermined intervals based on one of the timing means that is pre-selected out of said plurality of timing means according to a predetermined directive entered from said input means.

3. A displaying method for a programmable controller which includes internal information storage means for storing predetermined internal information relating to devices that each have an address, said programmable controller being equipped with a programmable controller unit and a peripheral device operating under the control of a sequence program, comprising the steps of:

displaying the internal information stored at the predetermined address of said internal information storage means; and reading and displaying sequentially and individually the information relating to said devices stored in said internal information storage means by sequentially changing a first predetermined number of the addresses at a first predetermined interval and the addresses following the first predetermined number of addresses at a second predetermined interval according to a predetermined directive entered.

4. A displaying method for a programmable controller which includes internal information storage means for storing predetermined internal information relating to devices that each have an address, said programmable controller being equipped with a programmable controller unit and a peripheral device operating under the control of a sequence program, comprising the steps of:

displaying the information stored at a predetermined address of said internal information storage means that corresponds to one of said devices;

directing and entering first and second display intervals; and reading and displaying sequentially and individually the storage contents of said internal information storage means by sequentially changing the address of information to be read for a first predetermined number of times at said first display interval and a for a second predetermined number of times at said second display interval.

* * * * *